(12) United States Patent
Monty et al.

(10) Patent No.: US 7,583,717 B2
(45) Date of Patent: Sep. 1, 2009

(54) LASER SYSTEM

(75) Inventors: Nathan P. Monty, Charlton, MA (US); Kenneth A. Lind, Brimfield, MA (US)

(73) Assignee: Videojet Technologies Inc, Wood Dale, IL (US)

( * ) Notice: Subject to any disclaimer, the term of this patent is extended or adjusted under 35 U.S.C. 154(b) by 361 days.

(21) Appl. No.: 11/214,043

(22) Filed: Aug. 30, 2005

(65) Prior Publication Data

US 2007/0195839 A1    Aug. 23, 2007

Related U.S. Application Data

(60) Provisional application No. 60/605,157, filed on Aug. 30, 2004.

(51) Int. Cl.
*H01S 3/22* (2006.01)
(52) U.S. Cl. .............................. 372/55; 372/61; 372/66
(58) Field of Classification Search .................... 372/64, 372/55, 61
See application file for complete search history.

(56) References Cited

U.S. PATENT DOCUMENTS

| | | | |
|---|---|---|---|
| 3,386,043 A | 5/1968 | Marcatili et al. ............. 398/142 |
| 3,641,454 A | 2/1972 | Krawetz | |
| 3,763,442 A | 10/1973 | McMahan | |
| 3,772,611 A | 11/1973 | Smith ............................ 372/96 |
| 3,852,684 A | 12/1974 | Roess et al. .................... 372/19 |
| 3,961,283 A | 6/1976 | Abrams et al. ................. 372/64 |
| 3,970,963 A * | 7/1976 | Chester ........................ 372/102 |
| 4,005,374 A | 1/1977 | Levatter et al. | |
| 4,064,465 A | 12/1977 | Hundstad ....................... 372/58 |
| 4,169,251 A | 9/1979 | Laakmann ...................... 372/64 |
| 4,287,482 A | 9/1981 | Wert, III ....................... 372/19 |
| 4,367,553 A | 1/1983 | Neracher | |
| 4,438,514 A | 3/1984 | Chenausky et al. | |
| 4,493,087 A | 1/1985 | Laakman ....................... 372/64 |
| 4,507,786 A | 3/1985 | Dezenberg et al. | |
| 4,507,788 A | 3/1985 | Barnie et al. | |
| 4,577,323 A | 3/1986 | Newman et al. ............... 372/64 |
| 4,677,638 A | 6/1987 | Beaupere et al. | |
| 4,750,186 A | 6/1988 | Steffen | |
| 4,757,511 A | 7/1988 | Klingel et al. | |
| 4,787,090 A | 11/1988 | Newman et al. ............... 372/82 |
| 4,805,182 A | 2/1989 | Laakmann ..................... 372/82 |
| 4,807,232 A | 2/1989 | Hart ............................. 372/18 |
| 4,807,233 A | 2/1989 | Hart ............................. 372/18 |

(Continued)

FOREIGN PATENT DOCUMENTS

DE    37 22 256    1/1989

(Continued)

OTHER PUBLICATIONS

U.S. Appl. No. 60/605,157, filed Aug. 30, 2004.

(Continued)

*Primary Examiner*—Dung T Nguyen
(74) *Attorney, Agent, or Firm*—Joseph A. Yosick

(57) ABSTRACT

A laser discharge, where the laser discharge can be formed by electrodes and at least one sidewall in a manner allowing a more compact structure than previously provided. Protrusions in the electrodes allow easier laser starts, and sectional sidewall(s) allow easier fabrication of sidewall(s), decreasing manufacturing costs.

18 Claims, 20 Drawing Sheets

U.S. PATENT DOCUMENTS

| | | | | |
|---|---|---|---|---|
| 4,807,234 | A | | 2/1989 | Hart ............................ 372/18 |
| 4,837,769 | A | | 6/1989 | Chandra et al. ................ 372/41 |
| 4,870,654 | A | | 9/1989 | Cantoni ........................ 372/93 |
| 4,884,282 | A | | 11/1989 | Bridges ........................ 372/97 |
| 4,932,775 | A | * | 6/1990 | Wissman et al. ............ 356/5.09 |
| 4,939,738 | A | | 7/1990 | Opower |
| 4,956,847 | A | | 9/1990 | Terai ............................ 372/87 |
| H000882 | H | | 1/1991 | Fox |
| 5,048,047 | A | | 9/1991 | Kozlovsky et al. ............. 372/92 |
| 5,079,773 | A | | 1/1992 | Hart et al. ...................... 372/18 |
| 5,140,606 | A | | 8/1992 | Yarborough et al. |
| 5,151,917 | A | | 9/1992 | Perilloux et al. ............. 372/102 |
| 5,321,717 | A | | 6/1994 | Adachi ........................ 372/100 |
| 5,327,446 | A | | 7/1994 | Waynant ....................... 372/61 |
| 5,353,297 | A | | 10/1994 | Koop et al. .................... 372/64 |
| 5,412,681 | A | * | 5/1995 | Eisel et al. ..................... 372/64 |
| 5,417,140 | A | | 5/1995 | Onozuka et al. |
| 5,467,362 | A | | 11/1995 | Murray ........................... 372/5 |
| 5,481,556 | A | | 1/1996 | Daikuzono |
| 5,508,851 | A | | 4/1996 | Tachizawa ................... 359/822 |
| 5,600,668 | A | | 2/1997 | Erichsen et al. ............... 372/87 |
| 5,608,745 | A | * | 3/1997 | Hall et al. ...................... 372/26 |
| 5,663,980 | A | | 9/1997 | Adachi ........................ 372/108 |
| 5,748,663 | A | | 5/1998 | Chenausky |
| 5,764,505 | A | | 6/1998 | Mixon et al. |
| 5,953,360 | A | * | 9/1999 | Vitruk et al. .................. 372/87 |
| 6,185,596 | B1 | | 2/2001 | Hadad et al. ................ 708/491 |
| 6,192,061 | B1 | | 2/2001 | Hart et al. ..................... 372/87 |
| 6,195,379 | B1 | | 2/2001 | Jones et al. |
| 6,414,979 | B2 | | 7/2002 | Ujazdowski et al. |
| 6,539,045 | B1 | | 3/2003 | Von Borstel et al. |
| 6,788,722 | B1 | | 9/2004 | Kennedy et al. |
| 6,891,865 | B1 | | 5/2005 | Ma |
| 6,928,223 | B2 | | 8/2005 | Walpole et al. |
| 7,197,060 | B2 | * | 3/2007 | Monty ......................... 372/87 |
| 2002/0131469 | A1 | | 9/2002 | Vitruk |
| 2002/0176469 | A1 | * | 11/2002 | Vogler et al. ................... 372/61 |
| 2003/0058913 | A1 | | 3/2003 | Shackleton et al. |
| 2004/0010912 | A1 | | 1/2004 | Jean |
| 2004/0218650 | A1 | | 11/2004 | Monty |
| 2005/0152425 | A1 | | 7/2005 | Monty |
| 2006/0029116 | A1 | * | 2/2006 | Shackleton et al. ........... 372/55 |

FOREIGN PATENT DOCUMENTS

| | | |
|---|---|---|
| DE | 42 29 138 | 3/1994 |
| GB | 2 253 515 | 9/1992 |
| JP | 01 152790 | 6/1989 |
| JP | 03 036774 | 2/1991 |
| JP | 3-119773 | 5/1991 |
| JP | 06 268285 | 9/1994 |
| JP | 08 008493 | 1/1996 |
| JP | 2002-329928 | 11/2002 |
| TW | 535 489 | 6/2003 |
| WO | WO 2004/068655 | 8/2004 |

OTHER PUBLICATIONS

Cheo, Peter K., "Handbook of Molecular Lasers", ISBN-08247-7651-8, Series: Optical Engineering, 1987 pp. 170-181, vol. 14, Marcel Dekker, Inc., New York U.S.A.

* cited by examiner

Figure 12: Dual Laser Disruption of Navigation System
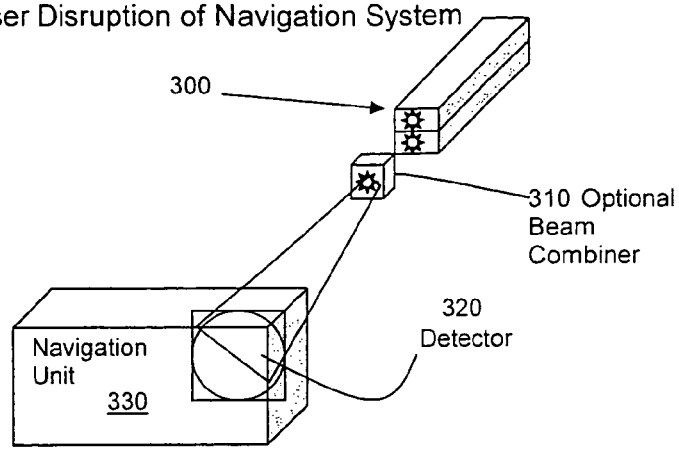
Figure 13: Gaseous Laser used for Fusion Heating
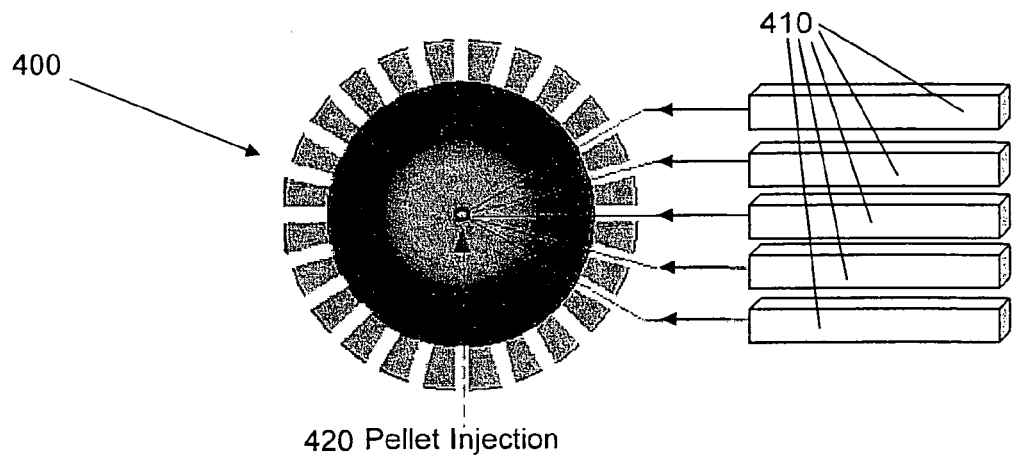
Figure 14:
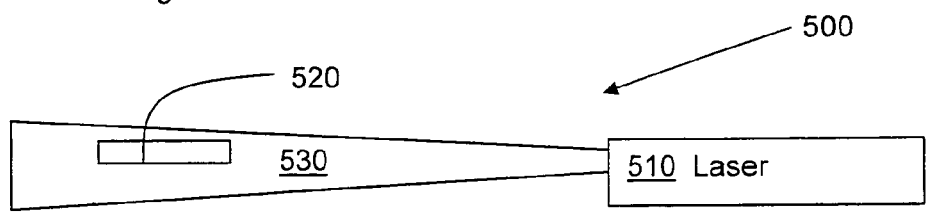

FIGURE 15
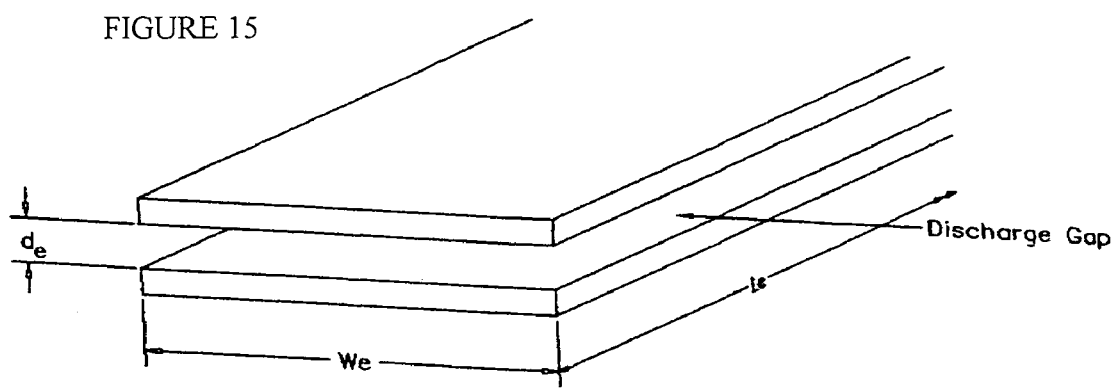
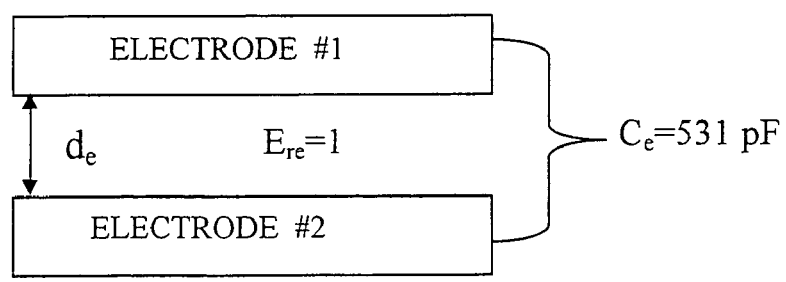
FIGURE 16

LASER SYSTEM

This application claims priority on U.S. Provisional Application No. 60/605,157, filed Aug. 30, 2004, the entire disclosure of which is hereby incorporated herein by reference.

FIELD OF THE INVENTION

The invention relates in general to lasers and particularly but not exclusively to RF excited lasers.

BACKGROUND OF THE INVENTION

A discharge laser typically consists of two mirrors, concave or flat, defining an optical resonator cavity coupled together with a discharge defining an optical path between the reflectors.

The discharge is typically a channel ground into a ceramic block (e.g. aluminum oxide, $Al_2O_3$) with a lower electrode of aluminum or copper added to complete a cross-section of the discharge. Alternatively, the discharge can be ultrasonically drilled down through a piece of ceramic such as aluminum oxide ($Al_2O_3$) to create a continuous closed bore length with upper and lower electrodes parallel to the bore length. Typically, the positive arm of the oscillating electromagnetic field (e.g. Radio Frequency—RF) supply will be coupled into the upper electrode of the discharge, and the ground plane of the RF supply will be coupled to the lower electrode. Resonance is added between and along the length of the upper electrode to distribute the RF standing wave evenly along the length of the electrodes. Finally, the mirrors and discharge structure are aligned and housed in a vacuum vessel (laser housing) that holds the gas to be excited.

Discharge lasers suffer from the disadvantage that, for the lengths needed, the discharges are difficult to fabricate with sufficient accuracy at a reasonable cost to obtain acceptable laser performance. It is very difficult to cost-effectively fabricate a typical discharge structure that is roughly 30 to 40 cm long with a 1.5 to 3.0 mm bore. Bore cross-section inaccuracy leads to unacceptable laser transverse mode characteristics and reduced power output. Due to the size, current ceramic discharges are constructed by casting or extruding. Casting tolerances are high, requiring expensive machining (grinding) after the piece is formed to acquire the desired accuracy.

Additionally, a discharge laser is a balance between the loss in its inherent internal RF circuit and heat removal efficiency. Ideally, to minimize the RF losses the capacitance between the top and bottom electrodes (RF+ and RF− or ground) needs to be high, which translates into using as little ceramic as possible in the discharge sidewalls. With $Al_2O_3$, thermal efficiency requirements dictate the use of a large ceramic area, which creates a lossy RF circuit. Ideally materials with good thermal properties such as BeO and AlN are desirable as the ceramic, but are prohibitively expensive with related art discharge designs.

Additionally the resonator cavities of discharge lasers suffer energy losses from misalignment of the containment mirrors, impingement of laser with the discharge walls, and reflectivity properties of the containment. For example the use of planar mirrors at either end of the resonator cavity, unless perfectly aligned, enable only a limited number of reflections. Thermal heating in high powered lasers can distort the reflectivity properties resulting in laser degradation.

Since the bore cross-sections, in the related art, are the result of grinding or ultrasonic drilling, most bores are either rectangular or circular. This results in bores that are optimized for the manufacturing process rather than the optical properties of the device. For example, the use of curved containment mirrors results in variable beam radius throughout the resonator cavity, thus the discharge channels of related art fail to allow the optimization of the discharge with respect to variable beam radius in the resonator channel.

In related art, the electrode positioning, and subsequent resonance electric field generation, is partly a function of the electrode spacing, and is often determined by the size of the discharge structure (i.e. the distance between electrodes). Various spacing between electrodes results in varying power levels and current. Current related art fails to fully optimize the electrode spacing and instead conventional methods focus on ease of manufacturing instead of optical optimization since a portion of the spacing is filled with the ceramic discharge structure.

Additional problems exist in conventional gaseous lasers, for example, laser startup. Traditional CO2 lasers are started at 70-80 torr and have difficulty starting without some manipulation of the system. The higher the startup pressure the higher the efficient use of the lasing medium, but the total power emitted decreases.

A related art system is described in Laakmann (U.S. Pat. No. 4,169,251). Laakmann is directed to a conventional Closely Coupled RF Excited (CCRFE) laser that suffers from many of the same problems as other conventional systems.

There are many uses for multiply combined laser systems. For example missile defense systems, atmospheric sampling, communication correction, etc. . . . For example, shoulder launched infrared missiles can have an infrared sensors in them to detect heat energy in the 3 to 5 and/or 8 to 12 micrometer wavelength band. Other energies used include the ultraviolet (UV) energy spectrum, which is below the visible spectrum. The near, mid and far infrared spectrums are above the visible spectrum in that respective order. Prospective targets, such as Jet engines, and the like, all emit much higher levels of infrared energy than visible energy (especially at night). So missiles that sense and track the infrared energy were developed in the early to mid 60s and introduced in the late 60s, such as the Redeye missile. The earliest missiles could use a four-quadrant detector, essentially a four-pixel detector in a 2×2 matrix. When the missile sees a shift in the energy from one pixel to the next (one quadrant to the next) the missile will turn slightly to recenter the energy (the energy would be equal on all four pixels). The missile has a viewing window of about 3 degrees so it does not have to steer much. Thus, the missile has to be launched straight at the target. The detectors also have a spinning wheel in front of the detector with a small hole in the wheel so the infrared energy only hits the pixels for the duration of the hole diameter per every rotation of the spinning wheel. The wheel allows the input from the detector to go from zero to full input power for each rotation (more signal strength), and also gives the sensor a time base (the wheel's spin is driven by the missile speed). The rate at which the infrared signal was acquired and tracked allows the missile to differentiate a decoy like a flare. A flare can be made to have the same infrared output of an engine, but flares do not move like engines (flares quickly slow down once ejected to gain separation from the jet) so the energy growth rate as the missile approaches the engine and flare would be different. The difference in the rate of infrared energy growth allows the missile to determine which infrared source is the engine versus the flare.

In order to make the missile more intelligent a second sensor can be added that looks for UV energy (and the name was changed to the Stinger missile in the mid 70s). Missiles now look at the infrared signal and confirms that there is an associated UV signal (referred to as 'two color' detectors by loosely borrowing the two wavelength phrase from the visible spectrum). Engines emit both types of energy. The UV sensor is only a signal input and all of the tracking is still done with the infrared energy detector.

Updated missiles can use focal plane arrays (array of 128× 128 pixels or even up to 1024×1024) so that there is an actual picture of the target transmitted to the missile CPU. Algorithms are added to ignore the sun, flares, and even a friendly target. This technology was added in the mid 80s, and is being expanded on today.

The British and the Swedes build their missiles with an optical output back to the person on the ground. The ground personnel then look at the infrared signal and manually steer the missile. The problem with the optical maneuvered missiles is that they are extremely hard to launch and steer so the missile hit rate drops significantly.

The task becomes how to fool or defeat the enemy infrared missile. Initially CO2 gas lasers were built that emit infrared energy at the correct wavelength to be added to the spinning wheel detector's input to cause a signal that the missile misreads, which causes the missile to veer off or explode prematurely because of the errant infrared signal. When the two color missiles became prevalent, Northrup Grumman (NG) and British Aerospace (BAE), formerly Sanders Corporation in NH, switched from CO2 or gas laser jammers to solid state crystal laser jammers. NG has switched over to YAG crystal technology and has all but closed their CO2 business and BAE Sanders never started a CO2 gas laser group because they assumed that the YAG solid state would replace it.

The solid state crystal laser jammers are based on a diode pumped YAG crystal and are much more frequency agile. Thus the laser can output both the infrared jamming signal and the UV signal. The YAG lasers can only jam the missiles detectors so they are useless against both the British/Swede type of design and are also useless against the new focal plane array detector technology.

Introduction for Laser Fusion Systems

The National Ignition Facility (NIF) is a facility constructed at the Lawrence Livermore National Laboratory (LLNL) for the study of laser fusion. The NIF facility has 192 laser beams, providing 1.8 megajoules, 500 terawatts for 3 nanoseconds, at 351 nm laser. The 192 lasers compress small fusion targets to conditions in which they ignite and burn. Krypton-Flouride lasers are being considered for use in laser fusion.

The Krypton-Flouride laser uses a high-voltage pulsed-power source, which generates a uniform electron beam from the cathode. The electron beam propagates through the foil support and deposits its energy in the laser cell, filled with krypton, fluorine and argon gases. A complex set of ionizations and chemical reactions produce the excited molecular state of KrF*. The input laser beam then stimulates the decay of this molecule to its ground state of separate atoms, with an enhancement of the laser intensity with the formulation:

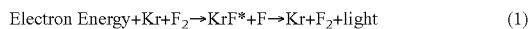

Electron Energy+Kr+$F_2$→KrF*+F→Kr+$F_2$+light    (1)

Lasers are used to heat fuel pellets because the time duration can be kept low, thus the power can be increased. The formulation for power is:

power=energy/(time duration)    (2)

Thus, if the energy is constant but the time duration can be decreased the power increases. For conventional fusion laser systems the energy in each shot is not very large (1.5 megajoules) but the duration is very short (nsec).

Introduction for Laser Communication Systems

Free-space laser communications has been in existence for decades. After the first demonstration of the laser in 1960, papers and patents addressing the feasibility of laser communication appeared two years later. Early attempts include reflecting signals from metallic coated, inflated satellites and hand-held communicators from the first manned space efforts.

The NASA deep space network is a region where the use of laser communications can be used to alleviate the current capacity limitations. To prevent a crisis that would leave valuable data stuck in outer space, the radio transmissions that download information from orbiting satellites and more distant spacecraft may be gradually replaced with laser-light-digital delivery. NASA is looking at near infrared lasers since the observation telescopes are already in existence. Further examples exist such as secured communications amongst military satellites.

Introduction to Scaling and Discharge

Problems exist in scaling up low power rf-excited gas discharge lasers to high power ones. The rf power distribution tends to become uneven over the discharge area and instead concentrates in one spot, thereby ruining what should otherwise have been a uniformly excited discharge suitable for efficient laser power extraction. It is known that this problem can be solved by making a high power laser appear to be an array of lower power lasers for rf purposes provided that it still looks like one high power laser for optical purposes. Gas lasers are commonly excited by either a direct current (dc) or a radio-frequency (rf) discharge, typically 10-150 MHz.

With dc excitation the "longitudinal" discharge is typically between two metal electrodes, a cathode (−) and an anode (+) placed at opposite ends of a hollow glass tube containing the low-pressure gas mixture. These "laser tubes" bear a resemblance to household fluorescent lighting tubes. A high electric field, typically 5-20 KV/m is required to "strike" the discharge between the electrodes. Once the discharge is struck, a slightly lower (50-80%) voltage is required to sustain the discharge. The current flowing through the discharge from anode to cathode is limited and regulated by a series "ballast" resistor.

With rf excitation the "transverse" discharge is typically between two closely spaced (1-5 mm) metal plates with discharge lengths of up to 1 m or so. An rf voltage is applied across the plates via an impedance matching network to transform the discharge impedance to equal the combined rf power supply output impedance and coaxial cable delivery characteristic impedance for maximum power transfer efficiency.

The laser output power can be increased by length scaling of the dc- and rf-excited discharges at about 1 W/cm for the carbon dioxide ($CO_2$) laser, for example. With rf-excited $CO_2$ lasers the output power can also be increased by area scaling of the discharge at about 1 W/cm². Area scaling of dc-excited $CO_2$ lasers can be problematic because of the tendency of the dc discharge to filament into a "lightning bolt" arc. Area scaling of rf-excited lasers is less problematic by virtue of the tendency of the rf discharge to spread out to fill the electrode area. For example, a 100W $CO_2$ laser can be excited by a 1 m dc- or rf-excited discharge length, or a 100 cm² rf-excited discharge area.

As the rf-excited $CO_2$ laser is area scaled to high powers of several hundred watts with several hundred cm² of discharge area, the discharges can "arcs out." One explanation for this is as follows: There are three types of rf discharge that can exit, the desired "alpha" discharge, an undesired "gamma" discharge and a catastrophic "arc", as described in "The characteristics and stability of high power transverse radio frequency discharges for discharge CO$_2$ slab laser excitation", Vitruk et al, J. Phys. D: Appl. Phys. 25, 1776-1776, 1992. The alpha and gamma discharges are characteristic of the Townsend alpha and gamma coefficients for primary and secondary electron emissions from the electrode surfaces. The arc discharge is characteristic of thermionic emission from the electrode surfaces. The discharge impedances, in decreasing order of impedance are the alpha, gamma, and arc. For low power CO$_2$ lasers up to 100W or so, the impedance discrimination between the alpha and gamma discharges is sufficiently great to ensure that the alpha discharge predominates. The impedance discrimination between a gamma discharge and an arc can be small and once initiated, the gamma discharge is capable of chemically and mechanically altering the electrode surface with discoloration and "pitting". This can increase the likelihood of the gamma discharge recurrence and its transition to an arc, especially during discharge initiation ("striking").

Unfortunately, as the discharge area is increased the alpha discharge impedance can decrease to a value closer to the gamma discharge value where there is less impedance discrimination between the two. The gamma discharge is a local area event and its area can be independent of the electrode area, so that several gamma discharges can exist simultaneously between two electrodes. For example, a gamma discharge might cover an area of 1 cm$^2$ with impedance ten times less than a 1 cm$^2$ alpha discharge, but equivalent impedance for a 10 cm$^2$ alpha discharge. A local area of alpha discharge can collapse into a smaller area of gamma discharge with equivalent impedance. This hypothesis is supported by the observation of alpha and gamma discharges existing alternately between a pair of electrodes in a CO$_2$ laser under similar operating conditions. The collapse may occur at a threshold rf power density (W/cm$^3$) that is a function of the operating conditions. The conditions may include gas pressure, gas mixture, electrode separation, rf frequency, rf power supply output impedance characteristics, the cable length (mismatch standing wave) between power supply and discharge, and the interelectrode voltage determined by the impedance matching network. In a similar way, a local area of alpha discharge collapses into a smaller area of arc with equivalent impedance. In this way the current can be delivered to a full alpha discharge between the electrodes which can be "funneled" into an arc with the same impedance, but with the catastrophic loss of laser power and electrode surface destruction. FIG. 16 illustrates a typical electrode configuration with a discharge gap, and FIG. 17 illustrates a typical capacitance value for the system shown in FIG. 16.

SUMMARY OF THE INVENTION

Exemplary embodiments of the present invention provide methods of gaseous laser construction.

Exemplary embodiments of the present invention provide methods and devices for the use of ceramic portions in the formation of laser discharge chambers.

Exemplary embodiments of the present invention provide methods and devices for the use of protrusions (e.g., electrode corner radii . . . ) in the formation of laser discharge structures.

Exemplary embodiments of the present invention provide methods and devices for the combination of protrusions with the use of ceramic portions in the formation of laser discharge regions.

Exemplary embodiments of the present invention provide for increased laser power and/or efficiency by optimizing electrode spacing.

An exemplary embodiment of the present invention provides a discharge laser having a discharge located in a laser resonator cavity defined by a first and second reflecting means at opposite ends of the discharge enclosed in a sealed vessel. The discharge structure is made up of multiple pieces that when joined together form the discharge walls. The discharge walls can be made up of individual pieces that allow the walls to be more accurately aligned. The individual pieces can be abutted one to another, or can be separated by a gap with little degradation in the laser power or mode.

Additional exemplary embodiments provide lasers that use multipath discharge paths.

Further exemplary embodiments provide for devices that use multiple and single lasers.

Additional exemplary embodiments of the invention provide for secure communication devices, fusion research, and missile disruptive systems.

Exemplary embodiments of the invention provide for methods/devices that provide discharge partitioning of a discharge laser.

In additional exemplary embodiments of the invention provide for secure communication devices, fusion research, and missile guidance disruption.

Exemplary embodiments of the present invention provide methods of gaseous laser construction using diffraction gratings to refine the frequency characteristics of the output beam.

Exemplary embodiments of the invention provides reflective means such as a grating that utilizes a Littrow angle for wavelength selection. The exemplary embodiment can have discharges that match the Litrow angle so the gap between the discharge walls and the grating is uniform all the way around the space between the two.

An exemplary embodiment of the present invention provides a laser (e.g. CCRFE) having a discharge located in a laser resonator cavity defined by a first and second reflecting means at opposite ends of the discharge enclosed in a sealed vessel. The reflecting means can be diffraction gratings. The discharge structure is made up of multiple pieces that when joined together form the discharge walls. The discharge walls can be made up of individual pieces that allow the walls to be more accurately aligned. The individual pieces can be abutted one to another, or can be separated by a gap with little degradation in the laser power or mode.

Further areas of applicability of embodiments of the present invention will become apparent from the detailed description provided hereinafter. It should be understood that the detailed description and specific examples, while indicating exemplary embodiments of the invention, are intended for purposes of illustration only and are not intended to limited the scope of the invention.

BRIEF DESCRIPTION OF THE DRAWINGS

Embodiments of the present invention will become apparent from the following detailed description, taken in conjunction with the drawings in which:

FIG. 12 is an illustration of a dual laser system for use in disrupting guidance systems in accordance with exemplary embodiments;

FIG. 13 is an illustration of a CO2 laser system for use in laser fusion in accordance with exemplary embodiments;

FIG. 14 is an illustration of CO2 laser system for use in laser communication in accordance with exemplary embodiment;

FIG. 15 illustrates an electrode geometry;

FIG. 16 illustrates the spatial relationship between the electrodes of FIG. 15;

DETAILED DESCRIPTION OF EXEMPLARY EMBODIMENTS OF THE PRESENT INVENTION

The following description of exemplary embodiment(s) is merely illustrative in nature and is in no way intended to limit the invention, its application, or uses.

Exemplary embodiments described herein are applicable for various laser systems with discharge regions, for example CCRFE lasers, lasers with waveguides, continuous wave or pulsed lasers, and the like.

Figure 1:
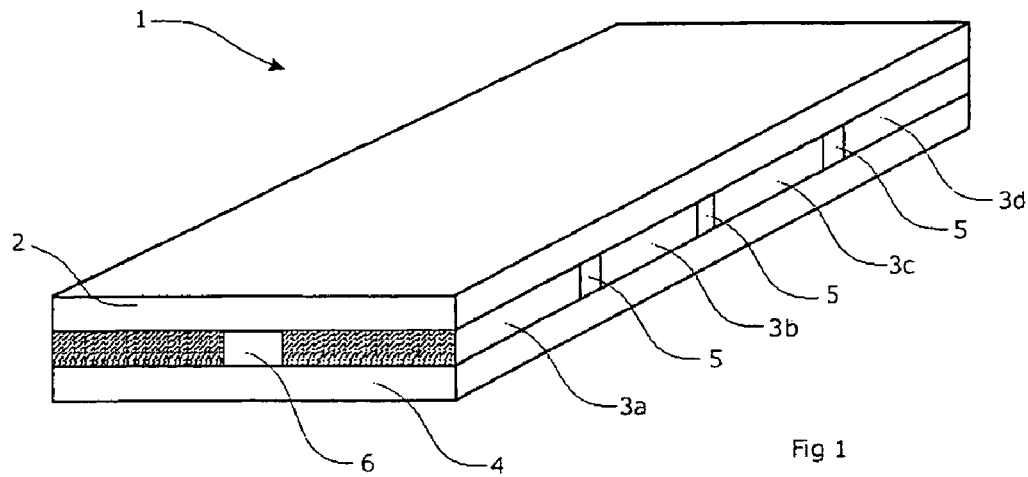
FIG. 1 shows a perspective view of a slab discharge laser (e.g. CCRFE) according to an exemplary embodiment of the present invention.

FIG. 1 shows a slab discharge laser 1 according to an exemplary embodiment of the present invention, comprising a top or upper electrode 2 and a bottom or lower electrode 4. The upper and lower electrodes, 2 and 4 respectively, can have variable shape (e.g., planar, variable thickness, curved . . . ). Sidewalls 3a, 3b, 3c, and 3d are sandwiched between the upper electrode 2 and the lower electrode 4 and can be separated by small gaps 5. The width and thickness of the sidewalls are shown shaded. The length of the sidewalls is not shaded.

The sidewalls 3a, 3b, 3c, and 3d and the upper and lower electrodes 2 and 4 respectively can form a discharge region 6. There can be gaps 5 between the sidewalls 3a, 3b, 3c, and 3d or no gap. In exemplary embodiments of the present invention there can be any number of gaps. In additional exemplary embodiments of the present invention, the sidewalls can seal the discharge region 6 at a predetermined pressure. The discharge region 6 can be sealed at various pressures depending upon the lasing medium or desired operating conditions. For example the discharge can have electrodes 2 and 4, side walls 3a, 3b, 3c, and 3d with no gaps. In this exemplary embodiment the side walls 3a, 3b, 3c, and 3d extend and surround the electrodes 2 and 4 to form the housing of the laser itself. Likewise the electrodes 2 and 4 can form the housing of the laser (e.g., FIG. 6C).

Figure 2:
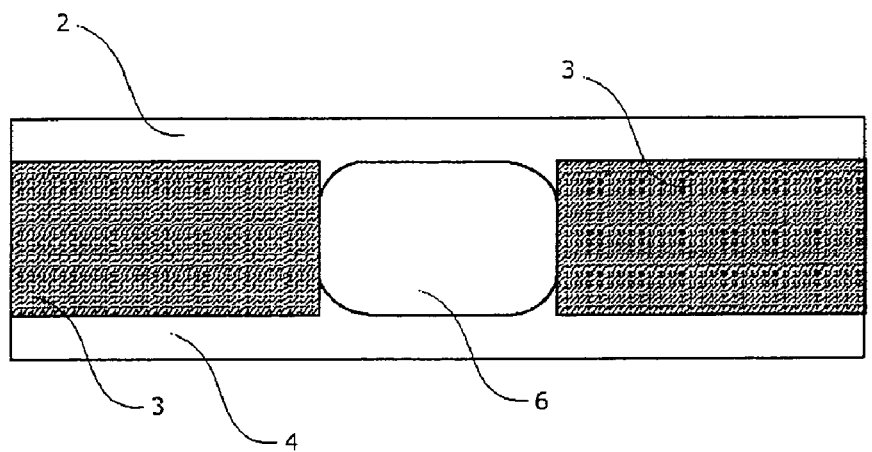
FIG. 2 shows a cross-sectional view of a discharge laser according to an exemplary embodiment of the present invention.

The sidewalls 3a, 3b, 3c and 3d (etc) act to guide the beam to an extent that there is little or no appreciable beam degradation or power loss even if there are gaps between the sections of the sidewalls or sections of the sidewalls and electrodes 2 and 4. Gaps 5 can be of variable size (e.g. 1-3 mm or more, . . . ) without affecting the beam. FIG. 2 shows an end-on view through a transverse section of the discharge laser 1 of FIG. 1. The upper electrode 2 and the lower electrode 4 are shown shaped so as to form the discharge region 6, with rounded corners (protrusions). The shape of the electrodes 2 and 4 are easily changed such that easier striking and better mode control of the beam is provided. In discharged lasers and other types of lasers, it is desired for circular symmetry to exist in the beam, which will produce the typical Gaussian shape to the beam intensity. The electrodes may be rounded further than is shown such that there is complete circular symmetry in the discharge, i.e. the discharge is completely circular in cross-section (e.g. as shown in discharge region 6 of FIG. 6A). In accordance with exemplary embodiments of the present invention the variable shaping of the cross section of the electrodes can be shaped by conventional methods (e.g., by CNC Milling, . . . ).

Figure 3:
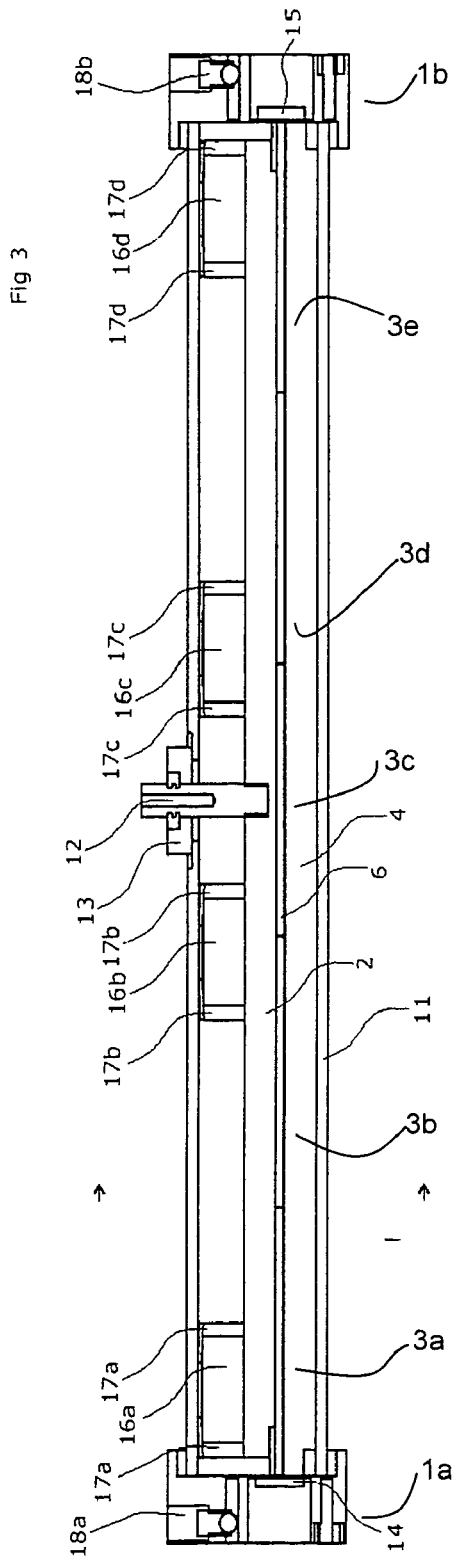
FIG. 3 shows a longitudinal view of section IV-IV of FIG. 4 of a laser, according to an exemplary embodiment of the present invention.
Figure 4:
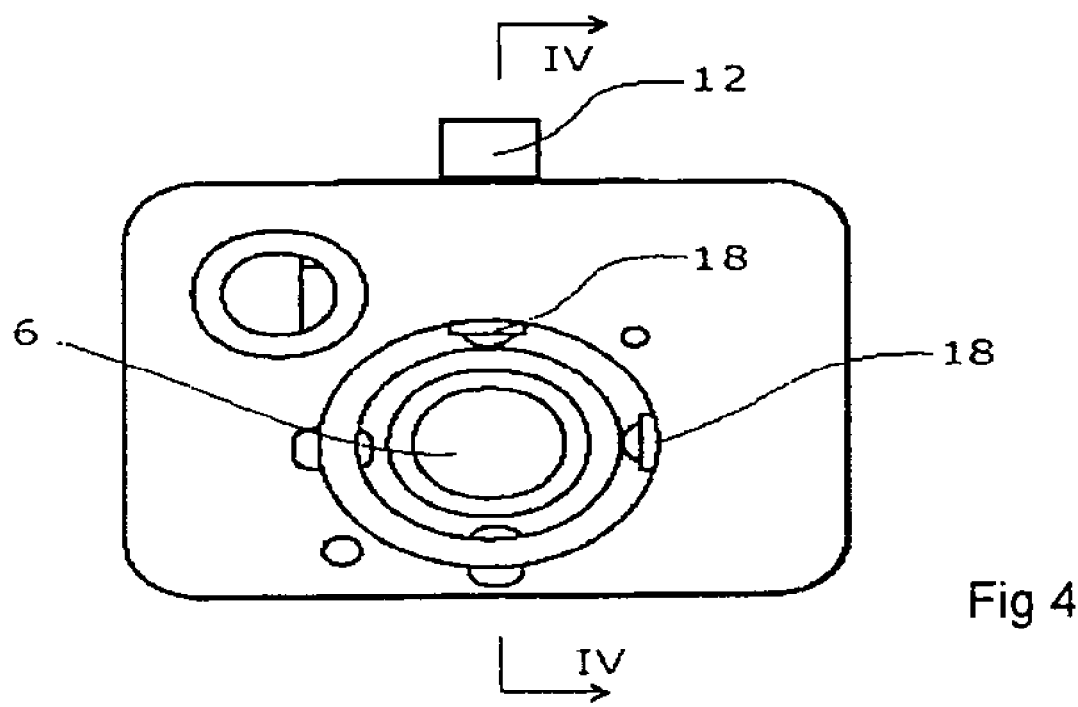
FIG. 4 shows an end view from the output coupler end of the laser, according to an exemplary embodiment of the present invention.

FIG. 3 shows a longitudinal view of section IV-IV of FIG. 4 in accordance with an exemplary embodiment of the present invention. The laser 1 can be disposed within a housing 11 and comprises a cavity contained between the two ends 1a and 1b. End 1a comprises a reflective surface and end 1b comprises a partially reflective surface which forms the output coupler. The RF feed-through 12 can be encircled in an insulating ceramic casing 13. The ceramic casing 13 can be comprised of various materials (e.g., BeO, AlN, $Al_2O_3$, other suitable insulating and/or dielectric material(s)). Although discussion herein has referred to various components, the arrangement of such components and the presence of such components should not be interpreted as being limitative on the scope of the present invention. For example, in accordance with exemplary embodiments of the present invention, a separate housing is not needed in a sealed discharge structure containing reflective elements, where the sidewalls or electrodes additionally form the housing.

The laser 1 can be contained in a housing 11, with an electrode top or upper plate 2 and bottom or lower electrode plate 4. The top or upper electrode 2 is shown here as continuous but can also comprise one or more sections to assist in alleviating warping due to temperature differentials between the topside and bottomside of the electrodes. The discharge region 6 can be between a total reflector 14 and a partially reflecting surface 15. The total reflector 14 and partially reflecting surface 15 can be placed at the discharge's 6 ends. The partially reflecting surface 15 can form the output coupler for the beam. The beam can make one or more passes through the discharge before exiting at the output coupler. Exemplary embodiments of the present invention should not be interpreted to be limited with regard to the number of discharges placed between the total reflector 14 and the partially reflective surface 15. Exemplary embodiments of the present invention can have multiple discharges, where the discharges can be connected or separate.

The exemplary embodiment of FIG. 3 illustrates a case where the ceramic sidewalls, 3a, 3b, 3c, 3d, 3e are abutted to each other, leaving no gaps. In this embodiment of the invention, four ceramic cylinders 16a, 16b, 16c and 16d are used to provide a clamping force between the laser housing and the electrode assembly to hold the laser together. The cylinders 16a, 16b, 16c, 16d can be made of various materials (e.g., BeO, AlN or $Al_2O_3$, other suitable ceramic, . . . ). They are shown here each provided with an inductor 17a, 17b, 17c, 17d, which ensures that the voltage difference along the length of the laser is minimized. In exemplary embodiments, at least one power source can be connected via connector 12.

Screw adjustors 18a and 18b can be used to adjust the optics. Other adjustors can be used to adjust the optics in other planes. Embodiments of the present invention are not limited by the type of optical adjuster and other methods commonly known by one of ordinary skill can be used. The present invention is also not limited to having an optical adjustor.

FIG. 4 shows an end on view of a laser is accordance with an exemplary embodiment of the present invention. Two optic adjustments means 18 can be placed orthogonal to each other to facilitate the adjustment of the optics in two planes, both perpendicular to the optical axis of the beam, the optical axis lying parallel to the bore 6. Other adjustment means, not shown, can be used for adjustment of the optics in the direction parallel to the beam.

Figure 5A:
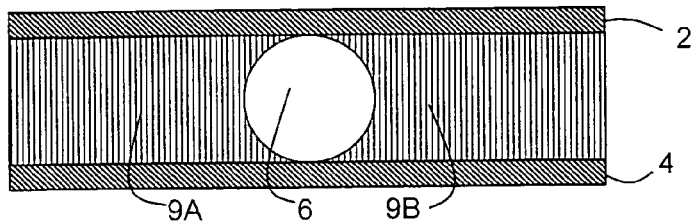
FIGS. 5A-5E show various laser discharge cross sections in accordance with exemplary embodiments of the present invention.
Figure 5B:
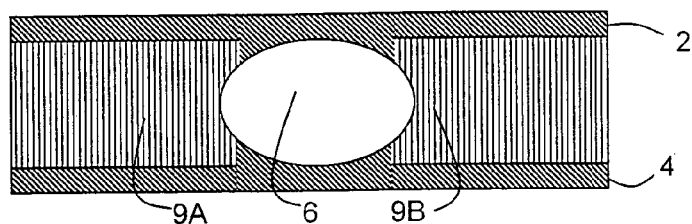
Figure 5C:
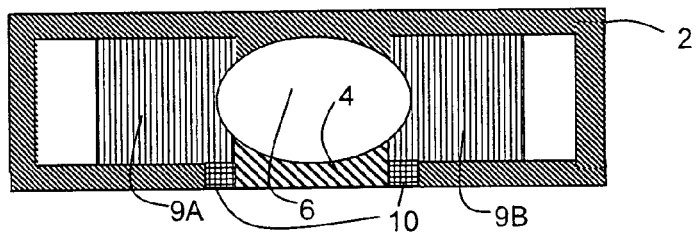
Figure 5D:
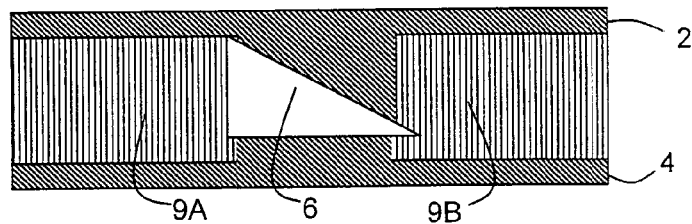

FIGS. 5A-5E show various cross sections of discharge region 6 in accordance with exemplary embodiments of the present invention. In FIGS. 5A through 5D, the discharge regions 6 are surrounded by electrodes 2 and 4 and side wall pieces 9A and 9B. The electrodes 2 and 4 and the sidewall(s) can have gaps and not lie flush upon each other. FIG. 5C shows the use of an electrode 2 to form a majority of the housing of a laser discharge in accordance with an exemplary embodiment of the present invention. Electrode 2 is separated from electrode 4 by an insulative spacer 10, which can be a protruded part of the ceramic side walls 9A and 9B. In further exemplary embodiments of the present invention the sidewall(s) can form the housing.

Figure 5E:
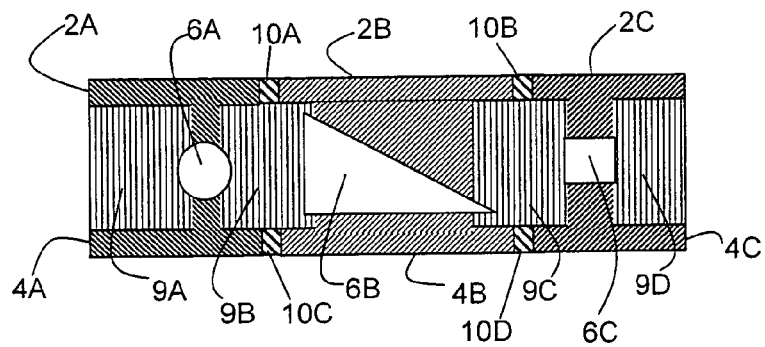

Multiple discharges (6A, 6B, and 6C) are shown in the exemplary embodiment of the present invention shown in FIG. 5E. As illustrated in FIGS. 5A-5E, exemplary embodiments of the present invention can have multiple shapes of the discharge region 6, multiple shapes and numbers of the electrodes 2 and 4 (e.g. 2A, 2B, 2C, 4A, 4B, and 4C), multiple numbers of discharges (e.g., 6A, 6B, and 6C), and multiple numbers of side wall pieces (e.g. 9A, 9B, 9C, and 9D). Additionally, the discharges can be connected at a location along their lengths. Likewise exemplary embodiments of the present invention can have insulators 10, 10A, 10B, 10C, and 10D to insulate the electrodes from each other. In an exemplary embodiment of the present invention one of the multiple discharges shown in FIG. 5E has no electrodes activated and the chamber acts as a cooling chamber for lasing gas. Where the cooling chamber is one of the discharges connected to second discharge somewhere along the length of the discharge. Where the second discharge has active electrodes and lasing occurs.

Figure 6:
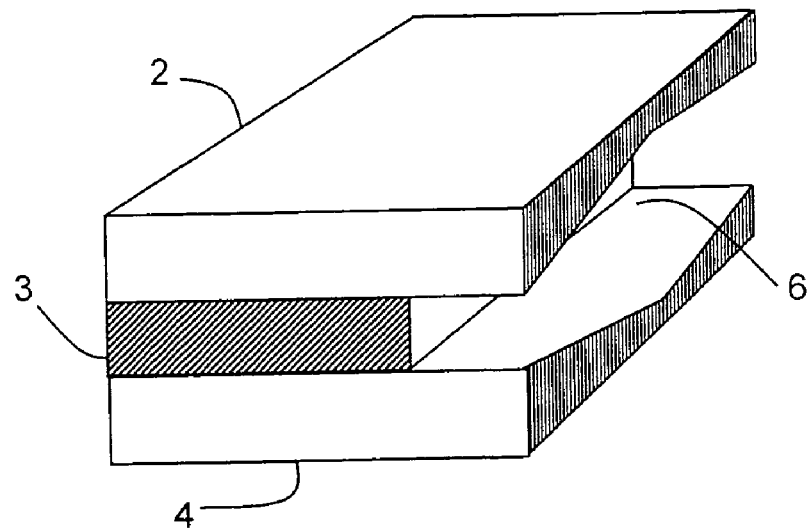
FIG. 6 shows a cross-section of a variable lengthwise discharge in accordance with exemplary embodiments of the present invention.

FIG. 6 shows a two dimensional lengthwise cross-section of a laser discharge in accordance with an exemplary embodiment of the present invention. The discharge region 6 has a variable cross-section, in the lengthwise direction, designed specifically for maximizing optical efficiency. The variable cross-section can be of varying shape depending on the optical modes in the discharge region 6. Although FIG. 6 illustrates a symmetric variable shaped cross-section in the lengthwise direction, the shape can be asymmetric or non-symmetrical.

Figure 7:
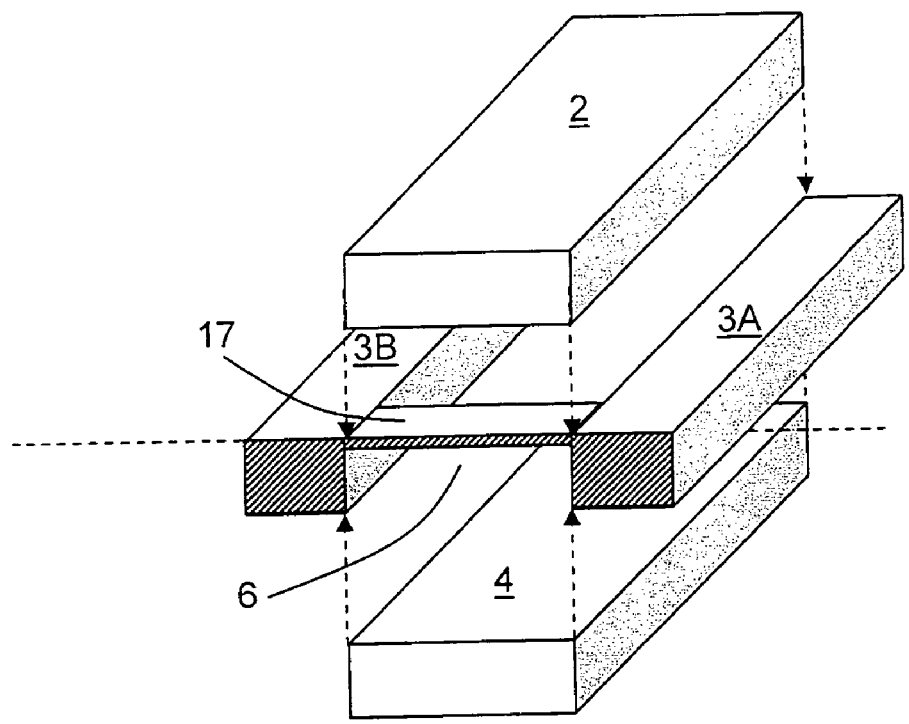
FIG. 7 illustrates an exploded view of a discharge section with single piece ceramic sidewall forming the walls of a discharge structure in accordance with an exemplary embodiments of the present invention.

Additionally the side walls forming the discharge region 6 can be connected by a strip essentially forming one sidewall with two separate sides. If one sidewall is formed then the strip adjoining the two separate sides can cover the surface of one electrode at a position along the length of the discharge region 6. FIG. 7 illustrates an exploded view of a laser discharge in accordance with an exemplary embodiment of the present invention having one sidewall with two main sections 3A and 3B. The main sections 3A and 3B can be connected by a strip 17, forming a single sidewall. The strip 17 can also be used to place the electrodes 2 and 4, and there can be many such strips of various shapes and sizes. The discharge region 6 is formed by two surfaces of the main sections 3A and 3B and surfaces of the two electrodes 2 and 4. The discussion herein should not be interpreted to limit the scope of the present invention to sidewalls with a strip connection or to one sidewall. Exemplary embodiments of the present invention can have multiple non-connected sidewalls.

Figure 8A:
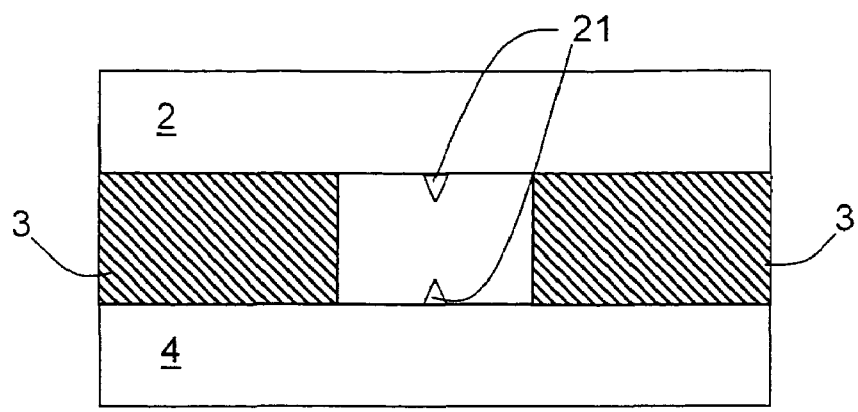
FIGS. 8A-8C show various discharge electrode protrusions in accordance with exemplary embodiments of the present invention.
Figure 8B:
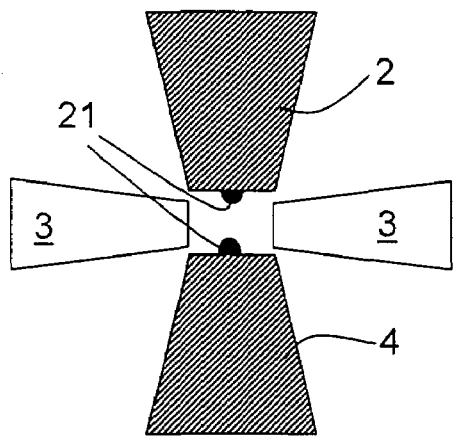
Figure 8C:
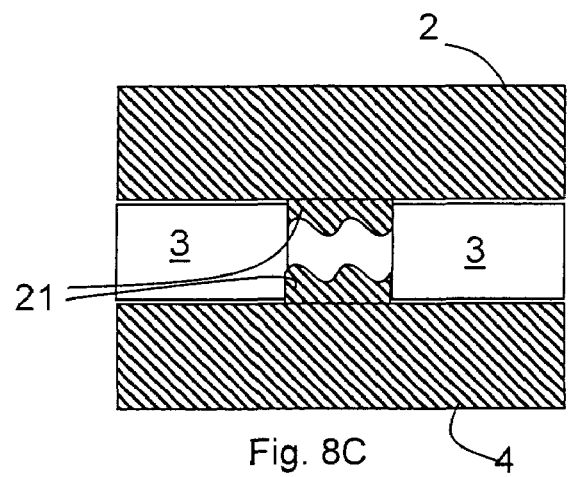

Protrusions aid in the starting characteristics of a laser. FIGS. 8A-8C show some exemplary embodiments of the present invention wherein the electrodes 2 and 4 contain protrusions 21. The protrusions 21 of the electrodes 2 and 4 aid in the starting characteristics of a laser by increasing the electric field in a localized region. For example a $CO_2$ discharge laser in accordance with an exemplary embodiment of the present invention, having protrusions, can start at 200 Torr pressure as opposed to 70 Torr. The starting pressures given by way of example should not be interpreted to be limitative of the present invention. Lasers in accordance with exemplary embodiments of the present invention can start at various pressures.

In the exemplary embodiments of the present invention described above, the sidewalls (e.g. 3a, 3b, 3c, 3d, 9A, and 9B) can be constructed of various materials depending on the dielectric properties desired. For example the sidewalls can be constructed of ceramic materials (e.g., Beryllium Oxide (BeO), Aluminum Nitride (AlN), . . . ), which are far superior in thermal and other characteristics to Aluminum Oxide ($Al_2O_3$), often used in related art discharge lasers. BeO and AlN are significantly more thermally efficient and significantly more reflective than $Al_2O_3$. For example, BeO is approximately ten times more thermally efficient. Exemplary embodiments of the present invention allow efficient use of the sidewalls such that the above mentioned materials can be used. Exemplary embodiments of the present invention can also use $Al_2O_3$.

In the exemplary embodiments of the present invention the upper (e.g., RF positive electrode) can be continuous to facilitate the distribution of the RF energy, or sectional. The sidewalls and the lower (e.g., ground electrode) can be continuous and/or manufactured in individual sections and assembled. Individual sections aid in reducing overall cost by providing a low cost standard repetitive platform that can be duplicated and aligned to produce a high quality discharge structure. The sectional structure will result in reduced cost compared to discharge structures presently in use. The discussion herein should not be interpreted to limit the present invention to a particular size sectional piece. Various sizes can be used for the length of the sectional pieces besides three inches (e.g., more than 80.0 mm, less than 80.0 mm) in accordance with exemplary embodiments of the present invention. For example in an eighteen inch laser, three sectional pieces can be approximately six inches in length or in a six inch laser each sectional piece can be two inches in length (if there are three sectional pieces. The discussion herein should not be interpreted to limit the dimensions of the sectional pieces. Exemplary embodiments of the present invention additionally contain various sectional pieces, where the pieces are not of equal length and/or width and/or thickness.

Laser discharge chambers in accordance with exemplary embodiments of the present invention can have shorter side walls than related art discharges. If the side walls are formed of sectional pieces, such as less than three inches, ceramics with favorable thermal properties (e.g., BeO, AlN, . . . ) can be used effectively and at a lower cost. Ceramics with favorable thermal reflectivity properties can maintain a high thermal conductivity while minimizing RF circuit losses.

The pieces can be formed by pressing, sintering or casting. Pressing allows the use of less milling (light milling) to obtain the tolerances needed, thus there is less milling costs. Milling of ceramic is often referred to as grinding. Sintering and casting are relatively cheap. For example, although BeO is approximately twice the price of $Al_2O_3$ yet it is approximately ten times more thermally conductive than $Al_2O_3$. AlN is approximately five time more thermally conductive. Since conductively is greater, less material is needed, and the resulting cost is reduced. In addition to cost savings, the superior reflectivity available from these materials provides higher efficiency.

In an exemplary embodiment of the present invention a gaseous lasing material is used such as $CO_2$ or mixtures thereof (e.g. $CO_2$, He, $N_2$, . . . ). A $CO_2$ discharge is unlike a fiber optic discharge in several relevant respects. The $CO_2$ discharge is referred to as a "leaky mode" discharge, so gaps in the discharge are possible and cause little or no adverse changes to the optical properties. Thus, the multiple pieces of ceramic or other suitable material (e.g., BeO, AlN, . . . ) do not have to be carefully joined and a gap can be left between one piece and the next. The gap can vary in size (e.g., one to three mm or more). Moreover, the top and bottom electrode can be shaped independently of the ceramic and each other, to form a profile that provides a better beam mode profile. For example some or all of the four corners of the discharge can be rounded to suppress higher order mode formations, and the distance between the top and bottom electrodes can be decreased along the ceramic sidewalls to allow for easier gas discharge initiation while maintaining the same overall gap size and consequently having approximately the same discharge volume (i.e. gain volume).

In exemplary embodiments of the present invention the various shapes of the electrodes allows higher peak power compared to related art devices. FIGS. 8A-C illustrates various electrode protrusion shapes in accordance with exemplary embodiments of the present invention. The protrusions (also referred to as nips) result in stronger electric fields in a limited regional area, thereby aiding in the startup of the laser. Such protrusions allow startups at pressures higher than conventional lasers. The increased laser pressure results in an increase of gain volume and subsequent increase pulse power capabilities, but with a decrease in the average power emitted from the laser. An exemplary embodiment of the present invention increases the temporal pulse length to maintain total pulsing power. Thus, quicker start and stop times can be achieved, with increased efficiency, while maintaining total emitted power, when compared to related art devices.

Figure 9:
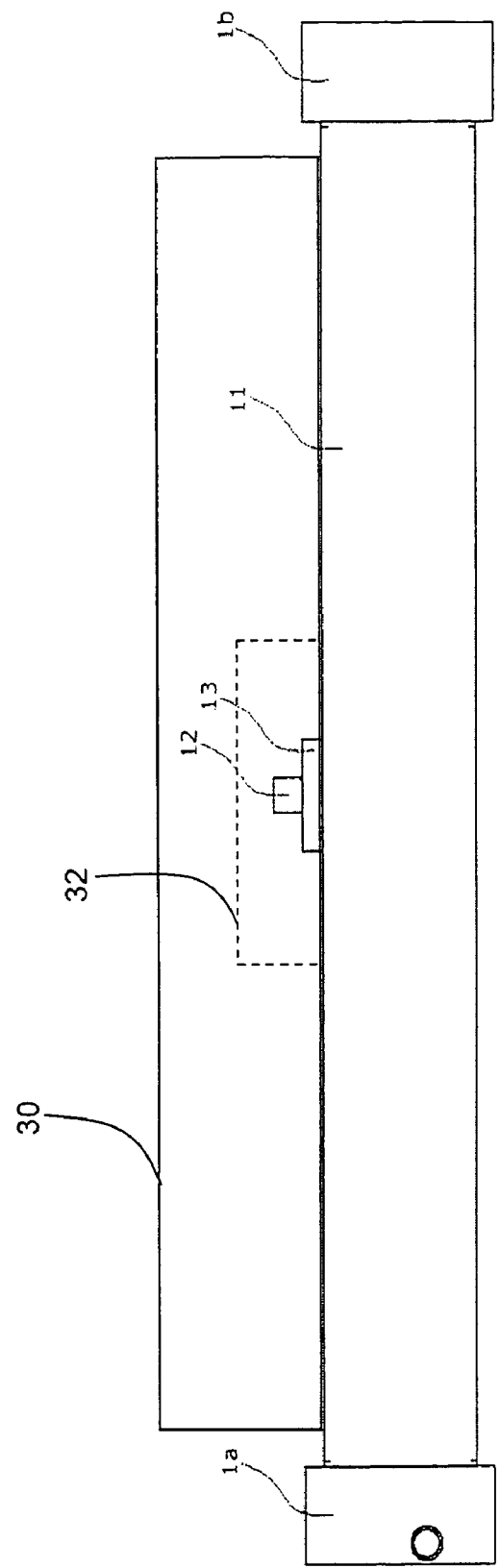
FIG. 9 illustrates a power-source connection in accordance with exemplary embodiments of the present invention.

FIG. 9 illustrates the connection of at least one power source in accordance with an exemplary embodiment of the present invention. A power source 30 is connected to a connector 12, which feeds power from the power source through the housing 11. In an exemplary embodiment of the present invention the power source is a radio frequency (RF) power source. A RF power supply for any gas laser is composed of one or more RF power transistors and control circuitry for both the transistor(s) and the interface between the RF power supply and the laser. The RF frequency that the transistors generate is unique to every laser but typically is at 40.68, 81.36 or 100 MHz. The control circuitry for the RF power transistors regulates both the RF oscillation and the RF power on/off switching. Conventional RF power systems use relatively old design practices in the transistor drive circuitry, because the RF power transistor's oscillations at 40 to 100 MHz disrupt any microprocessor's circuitry. Consequently the RF power transistor circuitry is presently designed to incorporate discreet components that are virtually insensitive to the power transistor's oscillations.

In an exemplary embodiment of the present invention, the RF power supply can be microprocessor 32 controlled. In this embodiment the microprocessor 32 runs at a frequency higher than the 40 to 100 MHz level of the RF power transistors. For example a processor at ten times the RF power level would be at 100 MHz×10=1.0 GHz. Any signal 'picked up' by the GHz processor can be significantly below its noise threshold such that the processor's operation is not impaired. Consequently the microprocessor 32 can replace existing discreet component circuitry that controls the RF power transistors. For example, various parts of the discrete TTL logic circuitry can be replaced by the microprocessor 32, for example a one shot discrete IC, that is part of the RF power transistor's VSWR protection circuit, can be eliminated. Additionally, various orgates, opamps and comparators can be eliminated. Other portions of the power system can be replaced by the microprocessor 32 and the discussion herein should not be interpreted to limit the portions replaced.

The use of a microprocessor 32 allows the RF power supply board to be manufactured at a lower cost and for the supply to be significantly smaller. The elimination of numerous discreet components greatly increases the microprocessor based supply's reliability compared to existing designs. The discussion herein is not intended to limit the number or type of microprocessor that can be used with/in the RF power supply.

Figure 10:
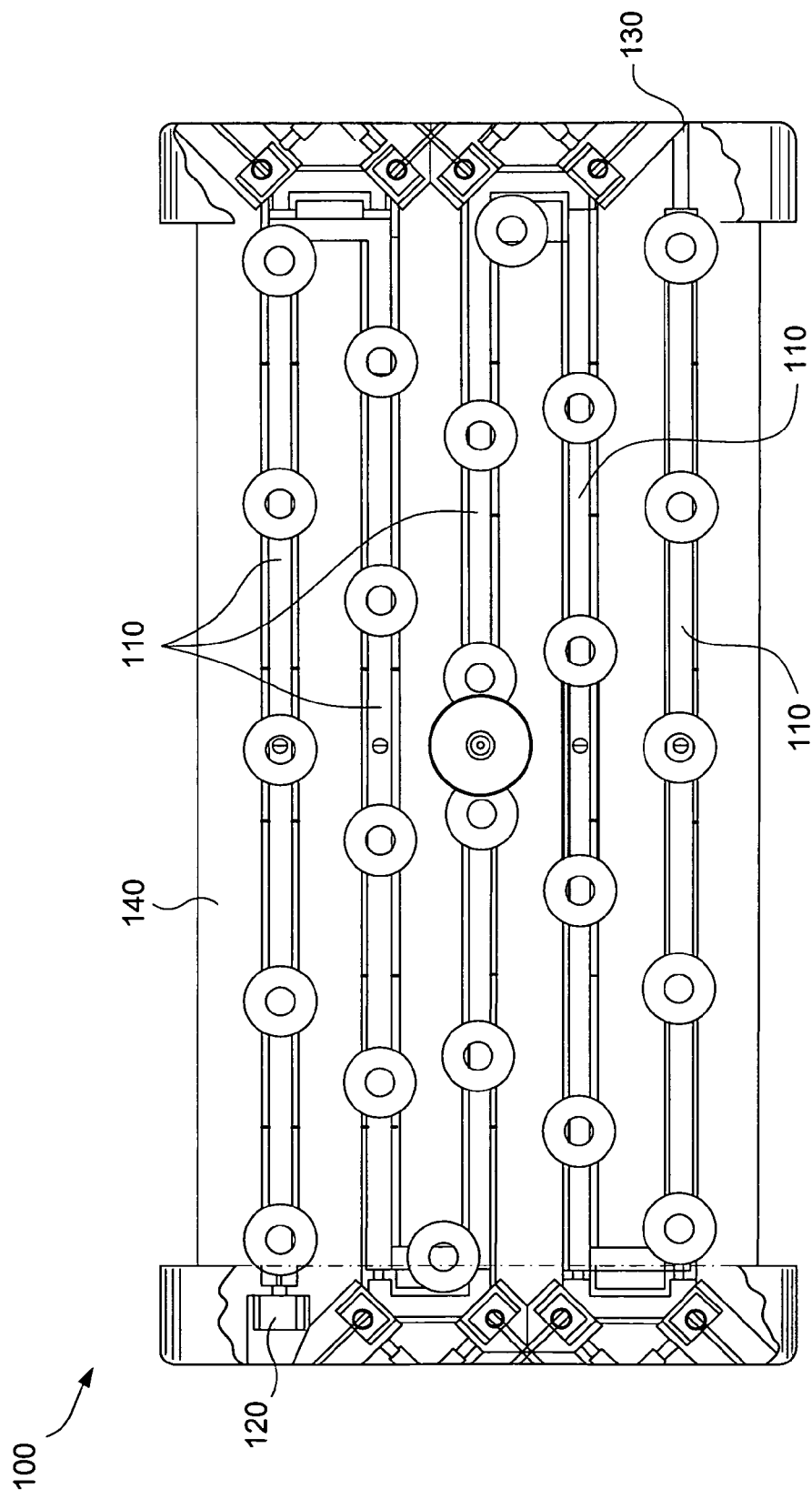
FIG. 10 illustrates a multipass discharge laser (e.g. CCRFE) in accordance with exemplary embodiments of the present invention.

FIG. 10 shows the top view of at least one exemplary embodiment of a multiple discharge path 110 discharge laser 100 in accordance with the present invention, where the laser resonator can have multiple passes (five shown in FIG. 10). The cross section (not shown) can be of any shape as suggested by the exemplary embodiments shown in FIGS.

Figure 11:
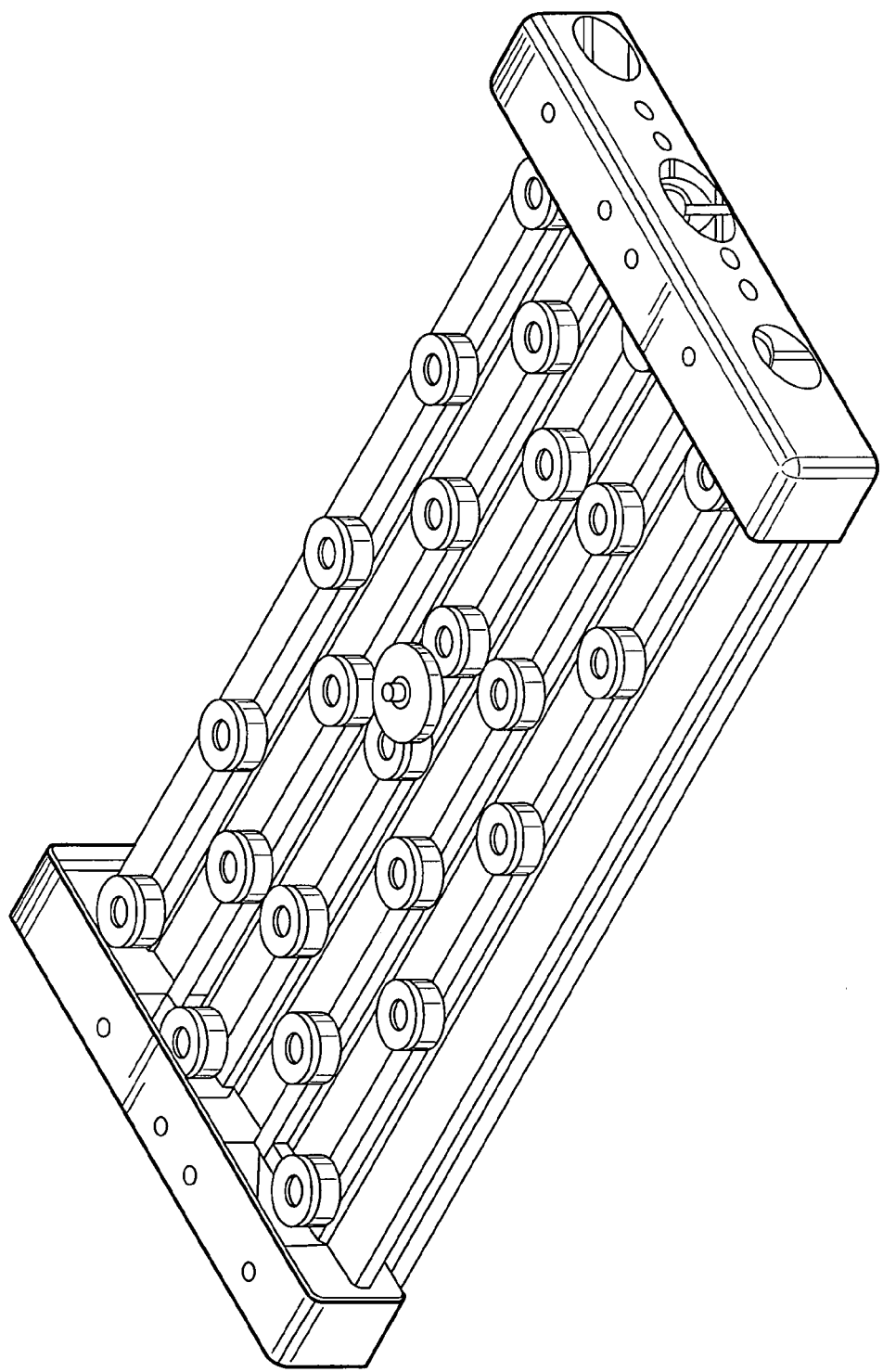
FIG. 11 shows an isometric view of the exemplary Embodiment of FIG. 10.

5A-5E. The sidewalls 140 form a portion of the discharge and the mirrors 120 reflect the laser within the resonator. The laser beam can exit through predetermined port(s) 130. Although five passes are shown in FIG. 10, exemplary embodiments are not limited to any particular number of passes. FIG. 11 shows and isometric view of FIG. 10.

The discharge laser shown in FIGS. 10 and 11 can be RF excited CO2 Lasers, although many lasing gases can be used as described above. The exemplary embodiment shown in FIG. 10 can have variable sizes (e.g. 22" long×11" wide×2" high, and the like) with variable total laser resonator sizes (e.g. 7.5 foot long laser resonator, folded five time, and the like). Optionally a solid-state RF power supply can be directly coupled to the laser. Depending upon the lasing material and operating conditions, which can vary depending upon desired use, the laser characteristics can vary (e.g. 10.6 µm wavelength; 2 kHz Rep Rate; 0.25 to 1 Joule per pulse, and the like). The wavelength can vary, the repeat rate can vary, and the power can vary, depending upon the materials used, lasing material, and power source. In at least one embodiment the power and wavelength can damage infrared heat sensing electronics.

Exemplary embodiments can reduce "free space" beam ballooning (mode distortion) and gas heating. Exemplary embodiments can have resonator structures that have five parallel discharge paths 110 (other arrangements are within the scope of the present inventions and the paths need not be parallel nor only five), optically linked to provide a contiguous discharge within the resonator. Existing 'V', 'N', 'W', 'NV' and 'WI' folded designs all compromise beam quality and gas heating, exemplary embodiments of the present invention reduce these effects.

In further exemplary embodiments a discharge laser in accordance with the present invention can be combined with other lasers to deliver laser power at multiple frequencies and power (e.g. YAG lasers, for disrupting missile imaging and guidance systems).

Manufacturing exemplary embodiments can use extensive ultra-clean manufacturing cycle(s). Exemplary embodiments can also be tested for potential gas contamination, then sealed (e.g. with a NASA developed polymer, metallic plug, clear plastic, and the like).

Exemplary embodiment's components can be computer aligned and can have precision turning mirrors, which provide width and height translation of the resonator from each discharge section to the next. Improved alignment of discharge sections results in at least one exemplary embodiment having stable beam quality, a mode structure less sensitive to temperature fluctuations, and improved discharge stability.

In at least one exemplary embodiment the discharge length is approximately set to create a single mode resonant structure at a desired wavelength (e.g. 10.6 µm, and the like). At least one exemplary embodiment of the present invention allows the resonator length and gas mixture to be adjusted to meet mission requirements Exemplary embodiments of the invention use both a CO2 gas laser and YAG crystal laser. In order to defeat the British/Swedes technology as well as Focal Point Arrays, one approach is to damage the array itself. In order to damage the array, a light (infrared energy) pulse can be projected 2 to 3 KM with enough energy density at the correct wavelength. YAG crystal lasers do not emit a beam coherent enough to deliver the pulse energy density required 2 to 3 KM away (at 2 to 3 KM the YAG beam would be so large in diameter that the energy density would be too low). A source of UV energy is needed—CO2 gas lasers are not frequency agile enough to emit a frequency below the visible spectrum so a YAG laser is required:

One method of defeating a missile, in accordance with an exemplary embodiment of the present invention, a pulse train of infrared light can be added to match the pulse train created by the hole in the spinning wheel. The switching device in the laser is referred to as a Q-switch. The Q-switch is a crystal that has a very low loss at the laser resonator frequency, but when an electrical signal is added the crystal interrupts the laser energy and then when the electrical signal is released the Q-switch is transparent to the beam again. By interrupting the resonator (turning the resonator off and on), light pulses are created (or vice-versa). The speed of the spinning wheel and the corresponding speed of the Q-switch are actually quite slow for the laser. Thus, exemplary embodiments of the invention can use a CO2 and YAG laser to create a jamming pulse, which can be sent with both lasers firing simultaneously. The $CO_2$ and YAG lasers can both send a jamming pulses, and then the CO2 gas laser can send a damage pulse. Thus a device in accordance with exemplary embodiments provides a combination jamming and damage laser system that would effect all types of missiles known today. One such exemplary embodiment 300 is shown in FIG. 12. A multilaser device 300 combines lasers, at least one in accordance with exemplary embodiments. The multilaser device 300 can emit multiple laser beams that can be combined using a beam combiner 310 (e.g. variable index of refraction optical crystal, multiple fiber optics, multiple lens arrays, and the like). The combined beam can be incident upon a detector system 320 (e.g. an infrared and UV detector, and the like) in a missile navigation system 330.

Likewise exemplary embodiments can be stacked to provide a total laser power which can be a combination of the powers of the individual stacked lasers. The stacked lasers can have various uses (e.g. laser fusion, welding, and the like). FIG. 13 illustrates an exemplary embodiment providing a laser stack 410 for use in fusion systems. The laser stack 410 can be used in a fusion system 400. When beams are focused onto the pellet 420 surface any distortions of the laser beam can result in intensity modulations at the target surface. For fusion purposes the intensity modulation can be of the order of one part in a hundred. In an exemplary embodiment of the invention an induced spatial incoherent (ISI) system is used to make a CO2 laser's intensity profile more uniform. Such systems typically work only on gaseous lasers. In the ISI system an oscillator illuminates a diffuser. The light leaving the diffuser becomes increasingly uniform. The light is now passed into the resonance chamber and mixes with the laser light such that the output laser light has a more uniform profile.

Additionally stacking lasers in accordance with exemplary embodiments can incorporate space more efficiently allowing more lasers and efficient power usage for laser fusion systems. For example, at least one exemplary embodiment varies the power system frequency and changes the gas to KrF which enables improvements (e.g. power, beam quality) over conventional systems. Although CO2 and KrF are discussed as the lasing medium other gaseous combinations can be used in the discharge chamber, varying the power frequency appropriately.

In further exemplary embodiments a gaseous laser similar to the one described in patent application Ser. No. 10/692, 860, "Waveguide Laser", filed 27 Oct. 2003, incorporated herein in its entirety, with various gases and power systems can be used for satellite system communications. The lasers can be tailored to the near infrared by varying the gaseous mixture, and can even be converted to blue green lasers for use in laser communication systems in underwater situations. One such exemplary embodiment is shown in FIG. 14. FIG. 14 illustrates a communication system 500, using a laser 510 in accordance with at least one exemplary embodiment. The laser pulse 530 is modulated to carry information, and is received by a receiver 520. Various configurations using lasers in accordance with exemplary embodiments of the present invention can be used in communication systems (e.g. satellite system communication and the like).

Further exemplary embodiments can be used to improve gas discharge lasers. Exemplary embodiment techniques can be applied to dc- and rf-excited gas discharge lasers in accordance with at least one exemplary embodiment to reduce discharge arcing are described herein. One of ordinary skill would recognize using a combination of these methods and devices to reduce discharge arcing in fluid cooled, gaseous cooled, or material cooled (e.g. ceramic, graphite, and the like) lasers in accordance with exemplary embodiments.

Pre-ionization

Pre-ionization can be used in accordance with at least one exemplary embodiment. The free electrons and charged gas species that are produced by pre-ionization of the laser gas can be accelerated by the applied rf alternating electric field. These species can produce more charged species by further collisions with gas species and with the walls of the electrodes until the discharge is initiated and self-sustaining ("struck").

Other methods of pre-ionization can be used in accordance with exemplary embodiments and the discussion herein should not be interpreted to limit the scope of the exemplary embodiments (e.g. Ultraviolet light pre-ionization of the gas—see for example U.S. Pat. No. 5,131,004, incorporated herein by reference in its entirety, and the like). Ultraviolet light with photon energies of a few electron volts can be used to ionize the gas species in a typical $CO_2$ laser gas mixture. Radioisotope pre-ionization of the gas is another pre-ionization method in accordance with exemplary embodiments, (e.g. see for example "Preionization of Pulsed Gas Laser by Radioactive Source", I. J. Bigio, J. Quantum Electronics, Vol. QE-4, No. 2, February 1978, incorporated herein by reference in its entirety). As with ultraviolet light pre-ionization, radioisotope pre-ionization can be used to ionize the gas species in a typical $CO_2$ laser gas mixture using either alpha-particles (with energies of a few MeV's) or beta particles (with energies of a few KeV's).

Ultraviolet and radioisotope pre-ionization techniques can be used to improve discharge-striking repeatability, reduce the discharge initiation time and allow discharge striking at increased gas pressures. These benefits may, in some laser device-specific applications, allow for discharge operation under conditions in which discharge arcing occurs less frequently, but under typical laser gas discharge operating conditions, neither ultraviolet nor radioisotope pre-ionization eliminate arcing at high power.

Idle-Power

In accordance with at least one exemplary embodiment continuous ionization can be used. Idle-power or "simmer" discharge continuous ionization of the gas is created by sustaining a low power discharge in-between discharge pulses. Pre-ionization can be used with idle-power ionization, but again the arcing is typically not eliminated at high power.

Electrode Material

In accordance with at least one exemplary embodiment various electrode materials can be used. By selection of the electrode material or by coating the metal electrodes with a metal or dielectric it is possible to select the primary and secondary electron work functions of their surfaces. The electron work function coefficients influence the electron energy distribution in the gas discharge and this affects the discharge breakdown voltage level during initiation and the discharge kinetics steady state conditions. Nickel electrode surfaces or anodized aluminum electrode surfaces, for example, have remarkably different electron work function coefficients versus aluminum electrode surfaces, and their discharge electrical behaviors are different consequently. These differences alone may not prevent discharge arcing at high power. The electrode pitting evidence of discharge arcing can be greatly reduced using nickel or anodized aluminum electrodes versus aluminum electrodes, for example, but this can be a result of the differences in their surface hardness and not necessarily through a reduction in arcing. Using a hard surface helps to suppress further arcing at the same location because a pit hole sharp edge at a previous arc location generates an electric field corona, which can trigger a subsequent arc at the same location.

Although discussion herein has referred to AL, Ni, Cu for electrode materials any conductive material (elemental or mixture) can be used for the electrode materials and the discussion herein should not be interpreted to limit the scope of the exemplary embodiments.

Discharge Segmentation

One method of preventing large area rf-excited alpha discharges from collapsing into gamma discharges and arcs is to segment the discharge area into separate and electrically isolated discharges. For the operating conditions, each segment discharge area is chosen to be smaller than the threshold area of alpha discharge needed to collapse into a smaller area of gamma discharge with equivalent impedance.

Exemplary embodiments in accordance with discharge segmentation can have a network of rf circuitry that can include rf power splitters and individual cables and impedance matching networks for each discharge segment.

In at least one exemplary embodiment a gaseous laser (for example He, Ne, $CO_2$, Gas Mixtures, and the like) can have low electrical-to-optical conversion efficiency of the $CO_2$ laser discharge of typically 10-15%, for example. Other % of optical conversion fall within the scope of exemplary embodiments and the discussion herein should not be limited to any particular range (e.g. optical conversion efficiency of 0.001-99.999%, and the like). In at least one exemplary embodiment the laser system is cooled (e.g. water cooled, dry ice cooled, fluid cooled, gas cooled, and the like), especially at high power, because the balance of electrical power is lost to electrode and gas heating which can be detrimental to the laser efficiency and output power.

The electrical isolation of discharge segments can use non-contiguous electrodes with individual plumbing or mechanically rigid structures. Additionally, open spaces between adjacent electrode segment surfaces can introduce significant propagation losses for the circulating laser resonator light and a reduction in the laser efficiency and output power, at least one exemplary embodiment can fill such spaces with ceramic, insulating, or reduced conductive materials.

In further exemplary embodiments, ceramic sides can be used in the formation of discharge laser for dissipation of heat. Such, discharge lasers (e.g. a discharge laser as described in patent application Ser. No. 10/692,860, "Waveguide Laser", filed 27 Oct. 2003) can be modified in accordance with the discussion herein Exemplary embodiments of the invention can use gaseous laser(s) (e.g. $CO_2$, Ne, He, KrF and other mixed gases, and the like).

In further exemplary embodiments a gaseous laser similar to the one described in patent application Ser. No. 10/692,860, "Discharge Laser", filed 27 Oct. 2003, with various gases and power systems can be used for satellite system communications. The lasers can be tailored to the near infrared by varying the gaseous mixture, and can even be converted to blue green lasers for use in laser communication systems in underwater situations. The description of the invention is merely exemplary in nature and, thus, variations that do not depart from the gist of the invention are intended to be within the scope of the embodiments of the present invention. Such variations are not to be regarded as a departure from the spirit and scope of the present invention.

Several exemplary methods and devices can result in the segmentation of electrodes in accordance with exemplary embodiments. In at least one exemplary embodiment each electrode can be covered with an array of parallel plate capacitors, as shown by way of example in FIG. 17. The current flowing in the discharge has to flow through the parallel plate capacitors. The reactance of each capacitor in the array of parallel plate capacitors adds extra impedance in series with the discharge to that capacitor. This increases the effective source impedance of the generator driving the electrodes, which can limit the current through that capacitor.

In a particular exemplary embodiment of the invention, a pair of 36" [914 mm] long and 4.5" [114 mm] wide aluminum electrodes were coated with 0.002" [50 um] hard-coat anodization of aluminum oxide dielectric. An array of 126×16 square gold "pads" (0.268" [6.8 mm]) with 0.016" [0.4 mm] spacing were screen printed and baked on to the 36"×4.5" surface using approximately 0.001" [25 um] thick organometallo gold paint. When the electrodes were assembled with a 0.070 [1.75 mm] spacing, the gold pads on the opposing electrode surfaces were in alignment.

In at least one exemplary embodiment, a pair of 36" [914 mm] long and 4.5" [114 mm] wide aluminum electrodes can be coated with 0.030" [0.75 mm] plasma-sprayed alumina oxide dielectric. An array of 20×2 rectangular zinc pads (1.712" [43.5 mm]×2.210" [56.1 mm]×0.010" [250 um]) with 0.080" [2.0 mm] spacing were plasma-sprayed through a mask on to the 36"×4.5" surface. In addition to the zinc pads, 0.125" [3 mm]×1.00" [25 mm] zinc strips can be plasma-sprayed on to the alumina coating from the 1.712" side of the rectangular zinc pads around the sides of the 35"×4.5" electrodes to facilitate the electrical connection of shunt inductors (described below) to the zinc pads. The 36"×4.5" electrode surfaces were polished flat using diamond paste on a flat granite table to produce a typical optical surface finish of less than 20 u" [0.5 um] used in infrared wave guides. When the electrodes were assembled with a 0.070 [1.75 mm] spacing, the gold pads on the opposing electrode surfaces were in alignment. Hence, the infrared wave guide spacing along and across the electrode slab was 1.75 mm between opposing pads and 1.85 mm between the opposing 0.080" [2.0 mm] spacings separating the pads. The intracavity round-trip infrared optical loss introduced by the periodic wave guide 2.0 mm wide spacing steps of 1.75 mm to 1.85 mm, can be at least an order of magnitude less than the typical optical gain of 0.5-0.8%/cm for rf-excited diffusion-cooled $CO_2$ discharge lasers. Thus in accordance with exemplary embodiments discharge arcing is reduced without ruining the laser optical arrangement.

Exemplary embodiments can have ceramic pads and inductors added to the electrodes to electrically divide the RF energy. The RF energy is fed into the laser at a single point and fed onto the top electrode at a single point and the ceramic pads and inductors electrically split the energy before it gets into the discharge gas.

Figure 17:
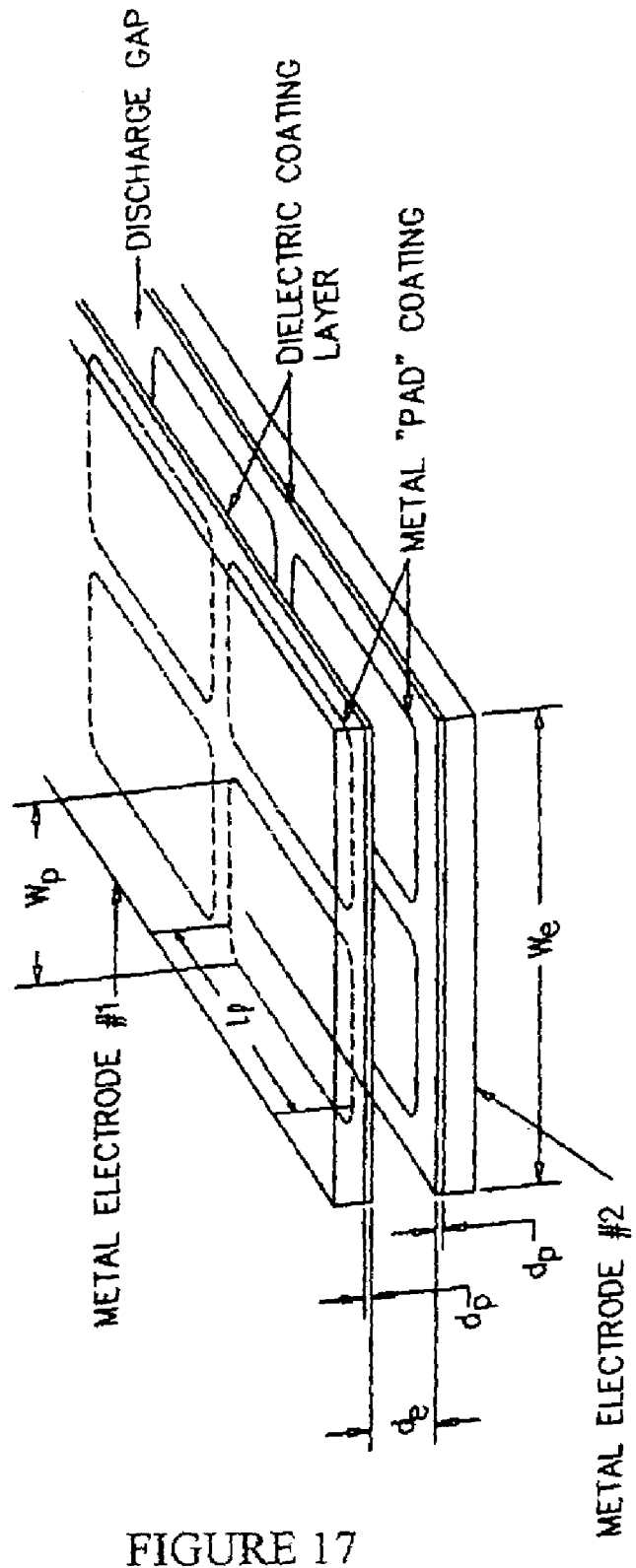
FIG. 17 illustrates an electrode configuration in accordance with at least one exemplary embodiment.

Further exemplary embodiments, as shown in FIG. 17, can provide methods for preventing large area rf-excited alpha discharges from collapsing into gamma discharges and arcs by impedance limiting the shared rf current delivered to area sections of a single pair of electrodes (with spacing $d_e$). Each metal electrode discharge surface (with length $L_e$ and width $W_e$) can be coated with a layer of dielectric (with thickness $d_p$ and relative permitivitty $E_{rp}$). The discharge can be segmented by coating metal "pads" on top of the dielectric layer (with length $L_p$ and width $W_p$). At least one exemplary embodiment with the general equations and several worked examples of the calculation of the discharge current are as follows:

The uncoated inter electrode capacitance $C_e$ is:

$$C_e = E_o E_{re} L_e W_e / d_e \tag{1}$$

The following examples of exemplary embodiments are by way of example only and are not meant to limit the scope of the present invention.

EXAMPLE 1

$E_o$=8.89 pF/m, $E_{re}$=1 for $CO_2$ gas mix, $L_e$=36"(914.4 mm), $W_e$=4.5"(114.3 mm), $d_e$=1.75 mm
$C_e$=531 pF
The capacitance between pad and it's electrode $C_p$ is:

$$C_p = E_o E_{rp} L_p W_p / d_p \tag{2}$$

EXAMPLE 2

$E_{rp}$=9 for alumina ceramic, $L_p$=2.210"(56.1 mm), $W_p$=1.712"(43.5 mm), $d_p$=0.030"(0.75 mm),
$C_p$=260 pF
The capacitance between a pad and the pad opposing it ("inter-pad") across the electrode gap on the opposite electrode $C_{pp}$ is:

$$C_{pp} = E_o E_{re} L_p W_p / d_e \tag{3}$$

EXAMPLE 3

$C_{pp}$=12.4 pF
With a strap inductance L in parallel with each pad capacitance the reactance at rf frequency f between pad and it's electrode is:

$$X_p = 1/wC_p, \text{ no strap inductance} \tag{4a}$$

$$X_p = wL/(1-w^2LC_p), \text{ where w=2 pi f} \tag{4b}$$

EXAMPLE 4

$C_p$=260 pF, f=81.36 MHz
$X_p$=7.5 ohms, (no strap inductance)
$X_p$=500.7 ohms, L=14.5 nH (near $w^2LC_p$=1, i.e. near resonance inductance)
For an alpha discharge resistance $R_d$=2.0 ohms over the 36"×4.5" electrode area, the electrode inter-pad resistance $R_{pp}$ is:
$R_{pp}=R_d n$, where there are n pads on each electrode (i.e. n discharge segments)

EXAMPLE 5

$$R_d = 2.0 \text{ ohm, n=40} \tag{5}$$

$R_{pp}$=80.0 ohms
The combined reactance of $R_{pp}$ in parallel with reactance of the inter-pad capacitance $C_{pp}$, $X_{pp}$ is:

$$X_{pp} = 1/(wC_{pp} + 1/R_{pp}) \tag{6}$$

EXAMPLE 6

$C_{pp}$=12.4 pF, $R_{pp}$=80.0 ohms
$X_{pp}$=53.1 ohms
Hence, the inter-pad reactance $X_{pp}$=53.1 ohms is "sandwiched between two limiting pad reactances, $X_p$=500.7 ohms. This means that the change in total series reactance $X_t=2X_p+X_{pp}$ for $X_{pp}=53.1$ ohms (alpha discharge) to $X_{pp}=0$ ohms ("worst case" arc) is $(X_t)_{alpha}=1054.5$ ohms to $(X_t)_{arc}=1001.4$ ohms, respectively. This represents an impedance decrease (and hence current increase, inter alia) of only 5.3%. This change will not support the transition from alpha discharge to arc so long as the absolute current does not cross the threshold required to sustain an arc.

Figure 18:
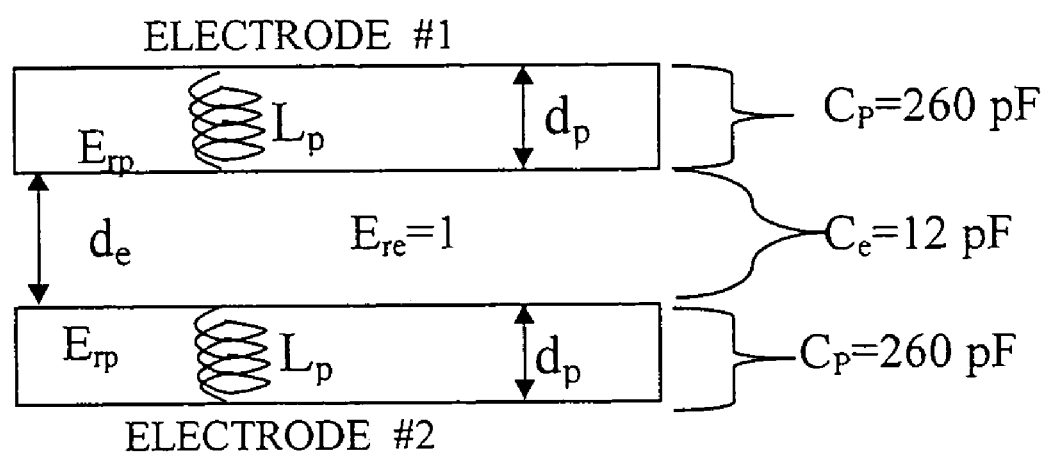
FIG. 18 illustrates a spatial relationship between electrodes in accordance with at least on exemplary embodiment.

For comparison, in the absence of the pad reactances, $2X_p$, the change in reactance $X_{pp}$ is $(X_{pp})_{alpha}=1054.5$ ohms to $(X_{pp})_{arc}=0$ ohms ("worst case" arc) is limitless. In actuality, $(X_{pp})_{alpha}/(X_{pp})_{arc}$ is finite and for a fixed value for $(X_{pp})_{arc}$ the threshold there can correspond to a pad area threshold. The operation of this system is similar to the "emitter-ballasting" technique used in transistors (reference) except that reactances are used instead of resistances. The advantage of using reactances instead of resistances is that they are nearly dissipationless and their aggregate capacitance (i.e. the array of capacitors in parallel) can be tuned out by an inductor in series with the electrode (see FIG. 18). Thus the discharge will be current limited.

In some cases, practical limitations on the thickness and/or permittivity of the dielectric may cause the capacitance of the pads to be so high (and therefore the reactance to be so low) as to make the ballasting ineffective. In these cases, some of the excess capacitance may be tuned out by a shunt inductor (see FIG. 18). This forms a parallel resonant tank circuit for each pad, which is resonant below the operating frequency so that at the operating frequency, the tank circuit has a net capacitive reactance. It is also possible to operate below resonance so that there is a net inductive reactance, resulting in inductive, rather than capacitive, ballasting. Having establishing series capacitors as described above, in at least one exemplary embodiment shunt inductors are added across the electrodes (see FIG. 18). This allows the implementation of a lumped element ¼ wavelength line current forcing technique, whereby currents in all capacitors can be forced to be equal, as if they were being driven by identical individual current sources.

The operation of at least one exemplary embodiment is similar to using ¼ wave lines to force current except that the ¼ wave line is replaced by a lumped equivalent. One of ordinary skill in the arts of in phased array antenna feed systems would be able to implement methods in accordance with exemplary embodiments. The circuit in FIG. 18 can be equivalent to a ¼ wavelength line of characteristic impedance Zo. An additional benefit of the lumped ¼ wave line besides ballasting is that it can be used to transform the load impedance of the discharge to a higher value by properly choosing Zo. This can potentially simplify the design of the matching network from a generator (e.g. a 50 ohm generator, and the like) to the laser.

Figure 19:
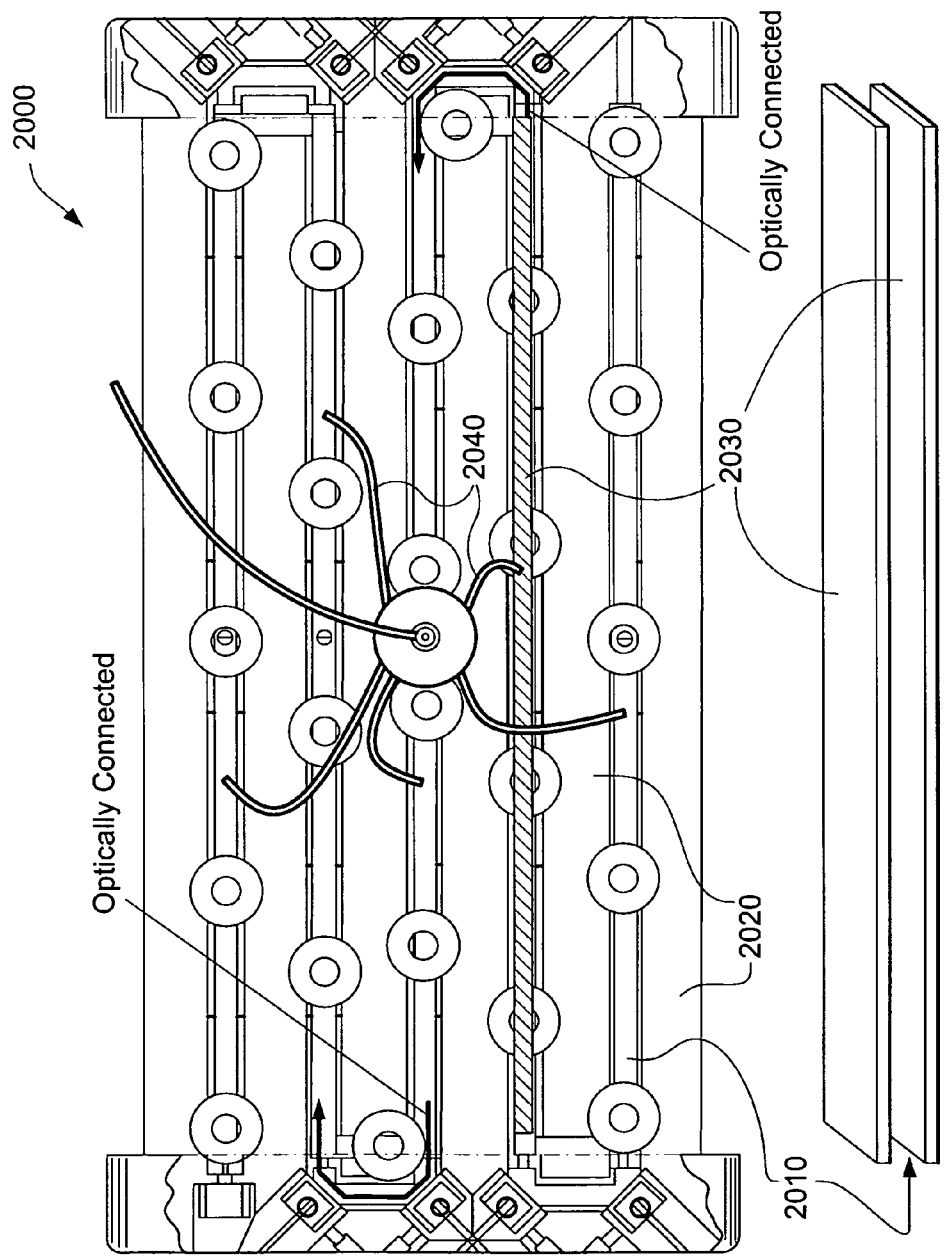
FIG. 19 illustrates a discharge laser in accordance with at least one exemplary embodiment.

Additional exemplary embodiments can split electricity, internally or externally to the laser, having separate feeds to separate electrode sections that are electrically isolated but optically connected (the light can not be allowed to leak out). These exemplary embodiments have no need for the ceramic pads and inductors of previously described exemplary embodiments if the different electrode sections are fed independently and electrically isolated, associated with multiple electrical feeds, one per isolated electrode section. Such a method/device in accordance with exemplary embodiments is shown in FIG. 19. FIG. 19 illustrates a top view of a discharge laser 2000 with a folded resonance chamber 2010 having sidewalls 2020 (e.g. BeO, ceramic, metals, and the like). Independent electrodes 2030 are fed by separate electrical feeds 2040. In at least one exemplary embodiment one electrical feed in input to the discharge laser 2000, with the electrical feed splitting in to "N" separate feeds for "N" independent electrodes.

Figure 20:
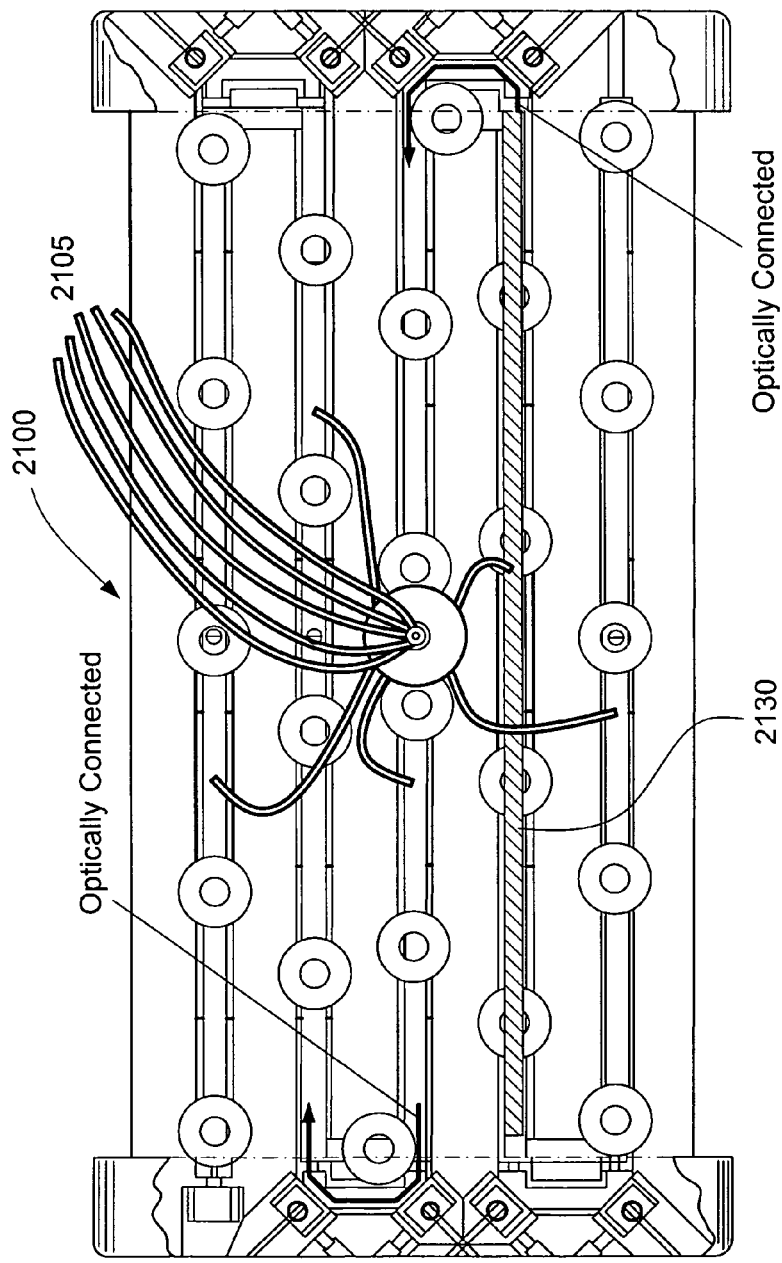
FIG. 20 illustrates a discharge laser in accordance with at least one exemplary embodiment.

In other exemplary embodiments the electrodes can be electrically independent as shown in FIG. 20. The separate feeds 2105 can be of an equal value feeding the top laser electrode in isolated sections. The laser top electrodes 2130 can be continuous because it is also part of the 'light guiding' mechanism we refer to as the discharge. In further exemplary embodiments the top electrodes can be segmented provided systems are provided to prevent light leakage out of the device. In an exemplary embodiment the electrical energy could have five cables (feeds) 2105 coming from the RF power supply with five feeding through into the laser and connect to the laser top electrode in five different sections (with the five electrode sections electrically isolated).

In at least one exemplary embodiment the laser system can be electrically driven by dividing the laser input power into numerous equal feeds and then feeding the numerous feeds through the laser vacuum vessel at multiple points to different electrically isolated sections of the top. Additional exemplary embodiments can feed the RF energy through a single RF feed into the laser vessel and then split the energy into three, four, five, etc feeds to the electrodes 2130. Although the particular exemplary embodiment shown in FIG. 20 shows five feeds, any variation in the number of fields is intended to fall within the scope of exemplary embodiments.

Figure 21:
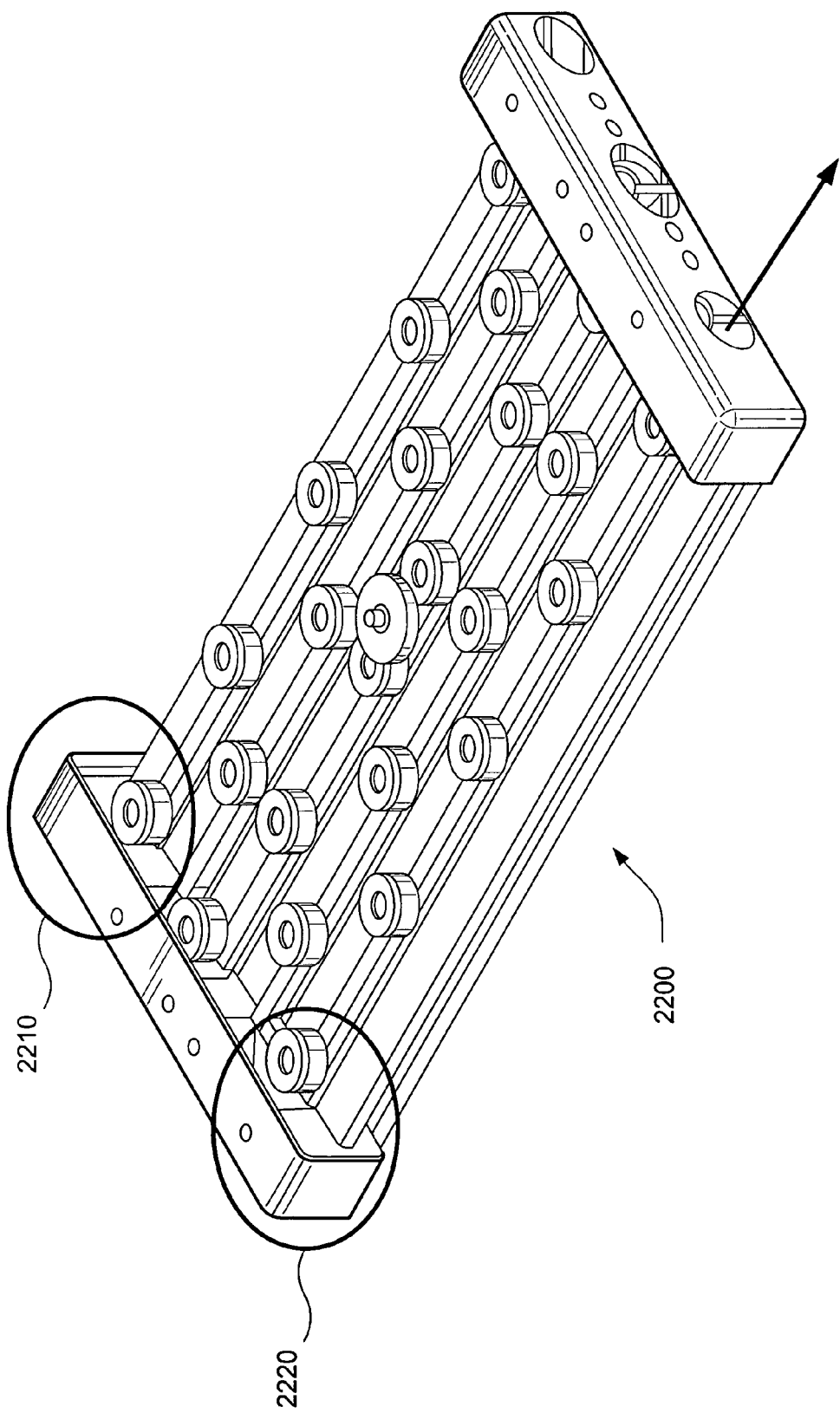
FIG. 21 shows an isometric perspective view of a slab discharge laser according to an exemplary embodiment of the present invention.

A discharge laser 2200 in accordance with at least one exemplary embodiment can have multiple discharge sections as shown in FIG. 21. The multiple discharge sections can have end reflective means 2210 and output reflective means 2220 (e.g. mirrors, prisms, diffraction grating, and the like) directing the laser to the output 2230.

Figure 22:
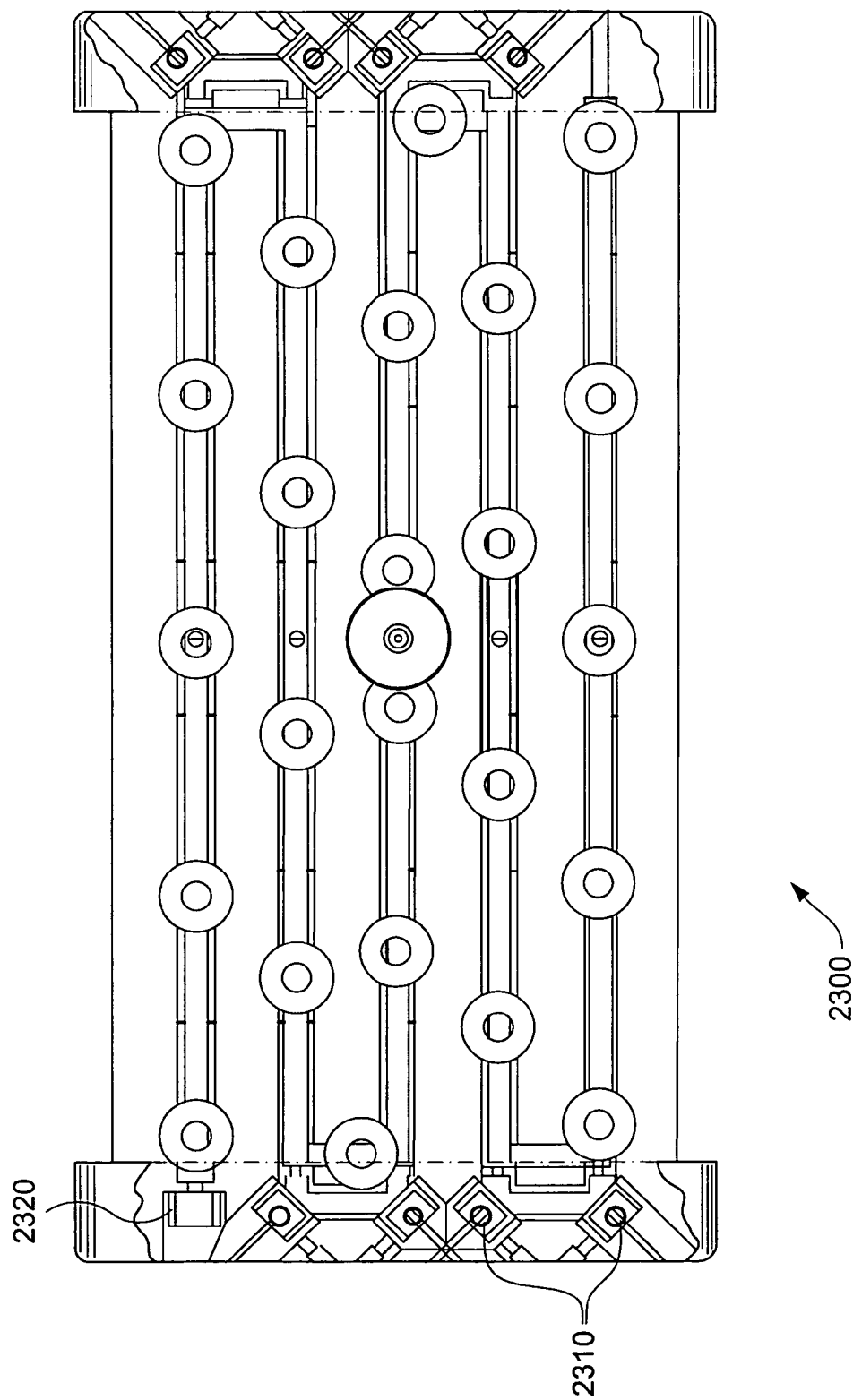
FIG. 22 shows a top view of a discharge laser according to an exemplary embodiment of the present invention.

A discharge laser 2300 in accordance with at least one exemplary embodiment is shown in FIG. 22. As shown the end reflective means 2310 and output reflective means 2320 (e.g. mirrors, prisms, diffraction grating, and the like) can direct the laser to an output or reflect the laser back through the discharges. Although the end and output reflective means are discussed, the other reflective means bending the light path through the various discharges can also be of various reflective means (e.g. mirrors, prisms, diffraction grating, and the like). If the reflective means is a diffraction grating the reflected light ray of a chosen frequency will reflect at a determinable angle. The discharge section housing the reflective means can be appropriately angled to redirect the laser light back through the next discharge section.

Figure 23:
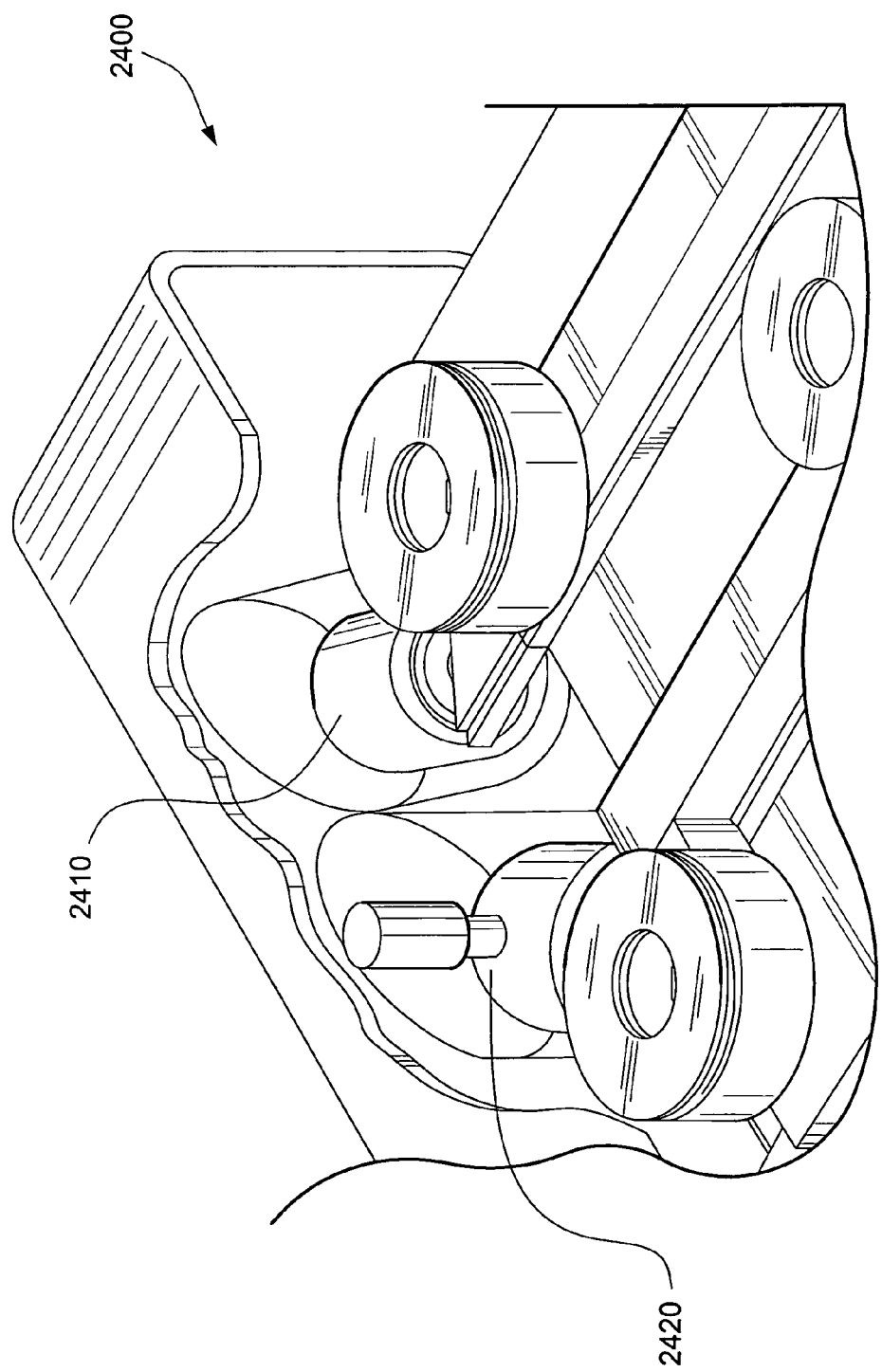
FIG. 23 shows an isometric view of a reflecting means arrangement in accordance with at least one exemplary embodiment of the present invention.
Figure 24:
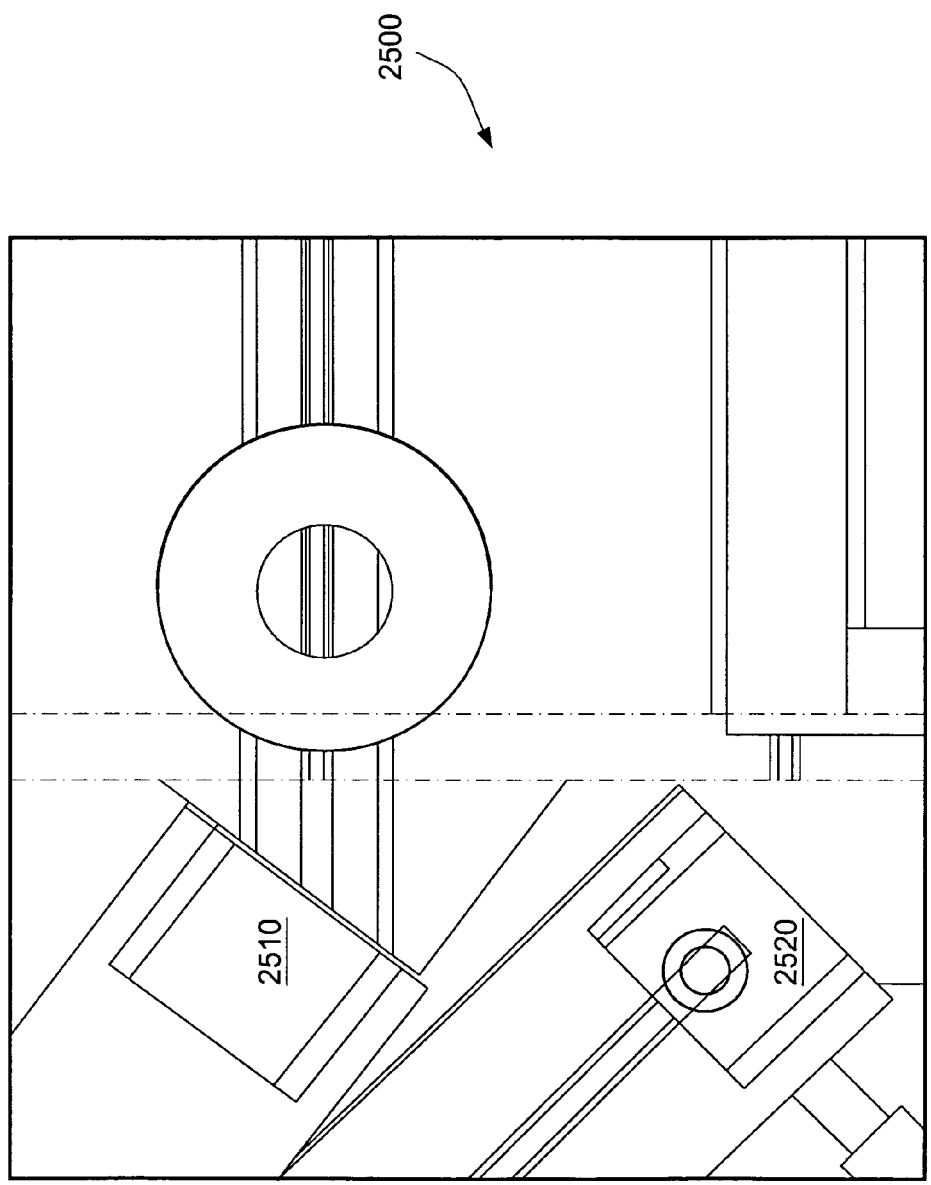
FIG. 24 shows a top view of a reflecting means arrangement in accordance with at least one exemplary embodiment of the present invention.
Figure 25:
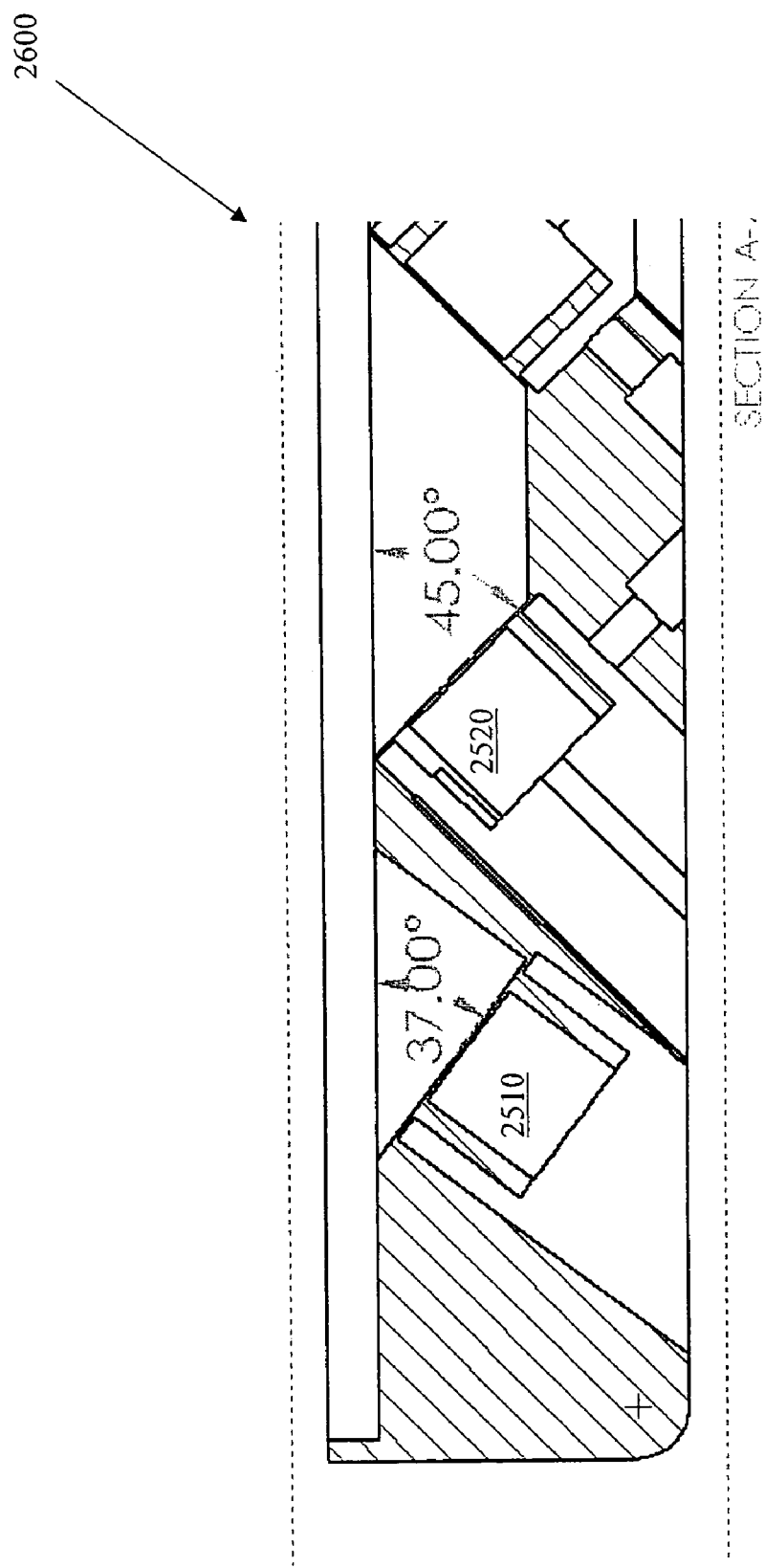
FIG. 25 shows a schematic of a top view from the output coupler end of the laser according to an exemplary embodiment of the present invention.

For example FIG. 23 illustrates an isometric view 2400 of the end reflective means and other reflective means 2410, 2420 used to direct the laser light through the discharge sections. FIG. 24 illustrates the associated top view of FIG. 23, 2400. Where the end reflective means 2510 can be a diffraction grating taking the laser beam incident and having multiple reflections. Each of the reflection occurring at a different angle in accordance with a particular frequency. With the end reflective means 2510 and/or the other reflective means 2520 (eg. The output reflective means, and middle reflective means), the incident laser light can be frequency refined and redirected back through the discharge or through the output.

FIG. 24 illustrates a reflective means arrangement 2600 in accordance with at least one exemplary embodiment where the angle chosen to incline the end reflective means (2510, 2520) (or any reflective means used) can be 37 degrees. Other angles can be used and the discussion should not be interpreted to limit the angle for example if the reflective means is a diffraction grating the surface of the grating may be inclined and thus the end reflective means can be a different angle. Likewise various housings and optics can be added or arranged to vary the angle.

Many exemplary embodiments have been discussed, however such discussion are not limitative of the scope of the invention. For example the power of exemplary embodiments can vary in power (e.g. 0.1 W, 10 W, 1000 W, 100000 W, and the like) and other optical properties can vary.

As discussed above exemplary embodiments can be used for all lasers (e.g. Closely Coupled RF Excited, CCRFE, lasers, waveguide lasers, and the like). Waveguide lasers are defined by the gap between the electrodes that guides the mode of the laser. As the gap between the electrodes is opened up the laser is still RF driven but the waveguides do not guide the mode any more, so it is not a "waveguide" laser. A laser's Fresnel number defines a waveguide laser with any laser having a Fresnel number<<1 defined as a waveguide laser. Typical RF excited lasers are not waveguide lasers but would benefit from the protrusion technology, microprocessor based control board, dual style control systems, and the like.

In at least one exemplary embodiment an RF Inversion is used. Many RF excited lasers form a sheath on the surface of the electrodes, both the positive and ground electrodes being excited. The sheath has a thickness that is significant enough to disturb the mode of the laser in the axis of the sheath. In a single pass RF excited laser the mode disturbance has to be tolerated but in a two or multiple pass laser the electrodes (or the excitation of the electrodes) can be rotated or flipped so that the sheath is rotated and the mode disturbance is averaged out or averaged in each axis. In a two pass system the RF is rotated 90 degrees in the two passes. In an eight pass system the RF could be rotated 90 degrees four times or could be rotated 45 degrees eight times. The RF can be rotated by changing the RF excitation path or by flipping the electrodes. For example FIG. 19 illustrates electrodes 2030 parallel to the plane of the multi-pass waveguide laser 2000. The electrodes in the resonance chamber can alternate between parallel to the laser plane and perpendicular to the laser plane or some variant between.

Further exemplary embodiments utilize a Tri Mode Power Supply—Existing lasers can be run Quasi-CW (or Gated Pulse or dual pulse), Continuous Wave, or superpulsed. Continuous Wave means the laser is turned on and the RF excitation is not pulsed although the RF excitation frequency can vary (e.g. between 1 to 1000 MHz, 13 to 100 MHz, and the like) so the RF source powering the laser is turning on and off, for example for 13 to 100 MHz, 13 to 100 million times per second with the RF frequency, but the laser is still considered to be running CW. Pulsed mode non-waveguide laser runs up to at least 20 KHz, and pulsed mode waveguide lasers runs at up to at least 70 KHz. Exemplary embodiments can have pulse modes up to 100 KHz. Further exemplary embodiments use other frequency ranges (pulse mode non-waveguide and waveguide lasers up to 10 MHz, and the like). The tri mode power supply can run CW, pulsed and dual pulsed mode. At least one exemplary embodiment laser can be run CW, the CW can then be pulsed in a train of pulses at repetition rates (e.g. 70 KHz) and thirdly the LiteLaser technology allows up to 100 KHz pulse train to be gated at up to 50 KHz at a 50% Duty Cycle. Other exemplary embodiments allow pulse trains, and gating in the range of 0.5 KHz to 100 MHz. This allows for a gated pulse operation where the gated frequency and pulse width can remain fixed yet the average power and the individual pulse energy can be varied.

Further exemplary embodiments can utilize forced air cooling fins.—Traditionally extruded fin arrangements are used on $CO_2$ lasers. Extruded fins are large and bulky, but have the added benefit of incorporating a heat spreader plate plus they are less expensive. At least one exemplary embodiment uses folded sheetmetal fins that allow for ten times more fin density than their extruded counterpart. Additionally the folded fins can be offset, dimpled, or crinkled so that laminar flow is disrupted when passing over the fins such that turbulent flow is created. Offsetting the fins for extruded technology is not possible. Additionally the fins can be attached to a heat conductive spreader plate (e.g. copper, Al, and the like) with thermally conductivity epoxy. Copper is twice the conductivity of aluminum so there are heat transfer advantages in using a dual material heatsink assembly. The fins themselves can be used directly on the laser body; the epoxied assembly of folded fins epoxied to the spreader plate can be used as the RF power supply heat sink.

Additional exemplary embodiments can use a controlled DC power supply. In order to change the average power level in an RF excited $CO_2$ laser it is advantageous to vary the DC power level into the RF power supply. In at least one exemplary embodiment the DC power supply can be manipulated to control the input power into the RF power supply board. With different DC level inputs the RF gives out variable RF power levels. At least one exemplary embodiment incorporates an RF power amplifier which is rated at an average power level yet has the ability to operate in a pulsed mode of operation at a peak power which is multiple (e.g. 2, 10, and the like) times the average power rating when the voltage is increased from a start voltage (e.g. 32V) to a final voltage (e.g. 48V). Operating at higher voltages varies the peak power output from the laser but imposes certain restrictions on the allowed duty cycle and pulse width. The control exerted in some exemplary embodiments allows for DC Voltage control from the laser that allows the customer to maximize laser peak power based on the limits for his particular application.

Exemplary embodiments can use a variety of methods and systems described herein, for example the Rf inversion method, Tri Mode power supply system, cooling fins, microprocessor, and control of the DC power supply discussed above, and the discussion herein is not intended to limit the scope to one or all uses.

The description of the invention is merely exemplary in nature and, thus, variations that do not depart from the gist of the invention are intended to be within the scope of the embodiments of the present invention. Such variations are not to be regarded as a departure from the spirit and scope of the present invention (e.g., other gases besides CO2 or CO2 mixtures can be used; protrusions can be used with an all metal system, where the ceramic side walls are replaced with metallic side walls; additional discharges can be used as coolant chambers, . . . ).

What is claimed is:

1. A laser discharge for use in discharge lasers comprising:
   at least one upper electrode, the upper electrode having a first surface; and
   at least one lower electrode, the lower electrode having a second surface,
   wherein the first surface and second surface are separated by at least one sidewall,
   wherein the first surface and the second surface face each other, portions of which are not completely covered by the at least one sidewall,
   wherein the first surface, second surface, and the at least one sidewall substantially fully surround the laser discharge, and wherein the discharge has a nonlinear shape including a plurality of parallel sections connected by at least one optical coupler.

2. The laser discharge according to claim 1, wherein the nonlinear shape includes five parallel sections each having respective upper and lower electrodes.

3. The laser discharge according to claim 2, wherein each electrode has a variable voltage and each electrod's voltage is set by a feed cable.

4. The laser discharge according to claim 3, wherein each electrode has a corresponding feed cable.

5. The laser discharge according to claim 1, wherein the upper and lower electrodes comprise separate sub electrodes.

6. The laser discharge according to claim 5, wherein the sub electrodes are produced by metal pad coatings on dielectric layers.

7. The laser discharge according to claim 1, wherein the nonlinear shape is substantially circular, ovular, triangular, or square when viewed in cross-section.

8. The laser discharge according to claim 1, wherein the laser discharge has a variable cross-section in a lengthwise direction thereof.

9. The laser discharge according to claim 1, wherein the upper electrode and/or the lower electrode include one or more protrusions.

10. A laser discharge for use in discharge lasers comprising:
an upper electrode, the upper electrode having a first surface;
a lower electrode, the lower electrode having a second surface, wherein the upper and lower electrodes each comprise separate sub electrodes; and
a reflective means,
wherein the first surface and second surface are separated by at least one sidewall,
wherein the first surface and the second surface face each other, portions of which are not completely covered by the at least one sidewall,
wherein the first surface, second surface, and the at least one sidewall substantially fully surround the laser discharge, and
wherein the reflective means is configured to refine the frequency of a formed laser beam.

11. The laser discharge of claim 10, where the reflective means comprises at least one mirror.

12. The laser discharge of claim 11, wherein the discharge has a reference axis, and wherein the mirror is inclined an angle with respect to the reference axis.

13. The laser discharge of claim 10, wherein the reflective means comprises at least one prism.

14. The laser discharge of claim 10, wherein the reflective means comprises a least one diffraction grating.

15. The laser discharge of claim 14, wherein the discharge has a reference axis, and the diffraction grating is inclined an angle with respect to the reference axis.

16. A laser discharge for use in discharge lasers comprising:
at least one upper electrode, the upper electrode having a first surface; and
at least one lower electrode, the lower electrode having a second surface, wherein the upper and lower electrodes comprise separate sub electrodes;
wherein the first surface and second surface are separated by at least one sidewall,
wherein the first surface and the second surface face each other, portions of which are not completely covered by the at least one sidewall,
wherein the first surface, second surface, and the at least one sidewall substantially surround the laser discharge, and
wherein the discharge has a nonlinear shape.

17. The laser discharge according to claim 16, wherein the sub electrodes are produced by metal pad coatings on dielectric layers.

18. The laser discharge according to claim 16, wherein each electrode has a variable voltage.

* * * * *